United States Patent
Lee

(10) Patent No.: US 9,817,475 B2
(45) Date of Patent: Nov. 14, 2017

(54) METHOD FOR TRACKING A USER'S EYE TO CONTROL AN INDICATOR ON A TOUCH SCREEN AND ELECTRONIC DEVICE THEREOF

(71) Applicant: Samsung Electronics Co., Ltd., Gyeonggi-do (KR)

(72) Inventor: Don-Young Lee, Gyeonggi-do (KR)

(73) Assignee: Samsung Electronics Co., Ltd., Suwon-si, Gyeonggi-do (KR)

( * ) Notice: Subject to any disclaimer, the term of this patent is extended or adjusted under 35 U.S.C. 154(b) by 148 days.

(21) Appl. No.: 14/660,623

(22) Filed: Mar. 17, 2015

(65) Prior Publication Data

US 2015/0261295 A1  Sep. 17, 2015

(30) Foreign Application Priority Data

Mar. 17, 2014 (KR) ........................ 10-2014-0031132

(51) Int. Cl.
   *G06F 3/01* (2006.01)
   *G06F 3/0488* (2013.01)
   *G06F 3/0486* (2013.01)
   *G06F 3/0482* (2013.01)

(52) U.S. Cl.
   CPC ............ *G06F 3/013* (2013.01); *G06F 3/0482* (2013.01); *G06F 3/0486* (2013.01); *G06F 3/0488* (2013.01)

(58) Field of Classification Search
   CPC ...... G06F 3/013; G06F 3/0482; G06F 3/0486; G06F 3/0488
   See application file for complete search history.

(56) References Cited

U.S. PATENT DOCUMENTS

| | | | |
|---|---|---|---|
| 2012/0176543 A1* | 7/2012 | Jeong | G06F 3/04883 348/563 |
| 2013/0169533 A1* | 7/2013 | Jahnke | G06F 3/017 345/158 |
| 2013/0169560 A1* | 7/2013 | Cederlund | G06F 3/013 345/173 |
| 2014/0168119 A1* | 6/2014 | Esaki | G06F 3/0488 345/173 |
| 2014/0195918 A1* | 7/2014 | Friedlander | G06F 3/04842 715/727 |
| 2014/0247232 A1* | 9/2014 | George-Svahn | G06F 3/02 345/173 |

(Continued)

FOREIGN PATENT DOCUMENTS

KR    10-2010-0006652    1/2010

*Primary Examiner* — Ryan A Lubit

(57) ABSTRACT

A method includes detecting a movement of an eye pupil in an eye tracking mode, moving an indicator on the screen according to the movement of the eye pupil, detecting a touch on a touch area, and in response to detecting the touch on the touch area, selecting an object on which the indicator is located, among the plurality of the objects on the screen. An electronic device includes a display configured to display displaying a plurality of objects on a screen, and a processor configured to detect a movement of an eye pupil through a camera in an eye tracking mode, move an indicator on the screen according to the movement of the eye pupil, detect a touch on the electronic device, and in response to detecting the touch, select an object on which the indicator is located, among the plurality of the objects on the screen.

16 Claims, 15 Drawing Sheets

(56) References Cited

U.S. PATENT DOCUMENTS

| | | | | |
|---|---|---|---|---|
| 2014/0308992 A1* | 10/2014 | Kurihara | ............... | G06F 3/0482 455/566 |
| 2014/0375596 A1* | 12/2014 | Kim | ...................... | G06F 3/0416 345/174 |
| 2015/0000025 A1* | 1/2015 | Clements | ................ | G06F 3/013 4/443 |
| 2015/0067580 A1* | 3/2015 | Um | ...................... | G06F 3/0481 715/781 |
| 2016/0179205 A1* | 6/2016 | Katz | ...................... | G06F 3/013 345/156 |

* cited by examiner

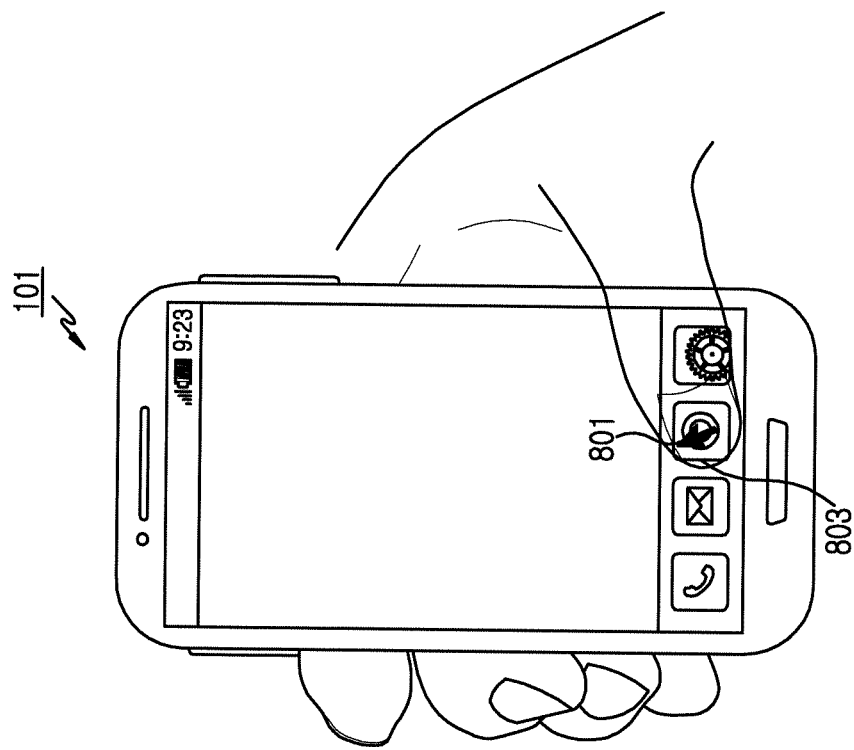
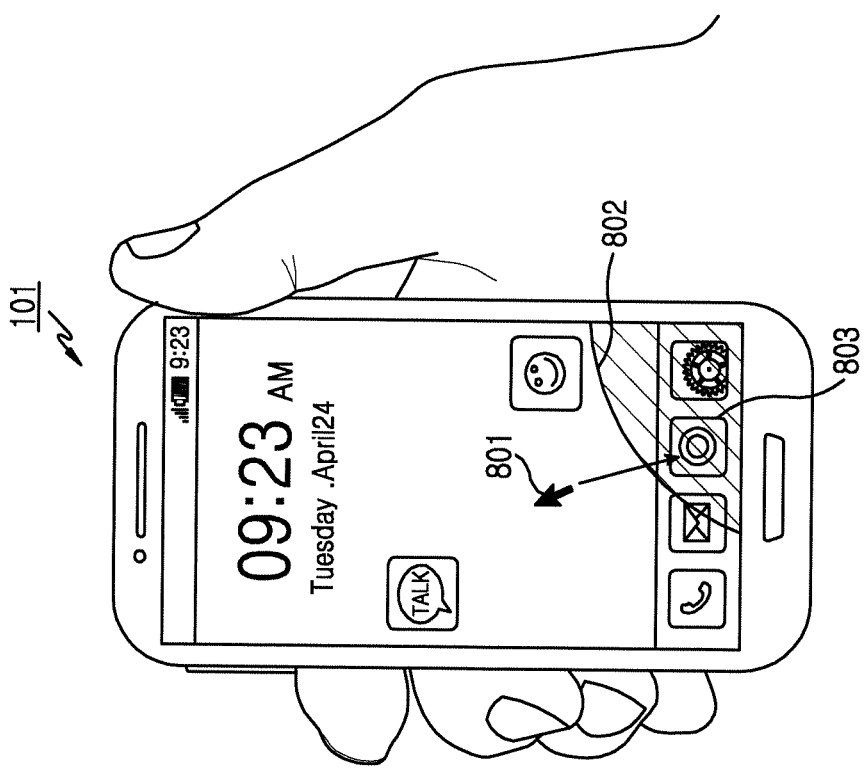
FIG.8B
FIG.8A

METHOD FOR TRACKING A USER'S EYE TO CONTROL AN INDICATOR ON A TOUCH SCREEN AND ELECTRONIC DEVICE THEREOF

PRIORITY

The present application is related to and claims priority under 35 U.S.C. §119 to an application number 10-2014-0031132 filed in the Korean Intellectual Property Office on Mar. 17, 2014 the contents of which are incorporated herein by reference.

TECHNICAL FIELD

Various exemplary embodiments of the present disclosure relate to a method of processing an input in an electronic device including a camera and a display, and the electronic device.

BACKGROUND

In an operation of an electronic device, a camera included in the electronic device can detect an input such as a designated movement and designated gesture of a user, and can handle it by using an instruction designated in the electronic device in response to the input. When the camera included in the electronic device detects a designated input, a pointer which indicates a designated position of a display in response to the input can be displayed at a corresponding position of the display.

SUMMARY

Although a display screen size of an electronic device is increased, since a weight of the electronic device becomes lighter, the electronic device can be used by one hand. If the electronic device is used by one hand, there may be a restriction when a designated position of a display is touched by a designated input means (e.g., a thumb). There is a need to provide a method capable of performing an input for an entirety of the display when the electronic device is used in a state of being gripped with one hand.

To address the above-discussed deficiencies, it is a primary object to provide a method of operating an electronic device that may include displaying a specific position in a display, and handling a touch detected in the display as a touch of the specific position.

According to various exemplary embodiments of the present disclosure, an electronic device may include a display for displaying a specific position and for detecting a touch, and a processor for providing control to display the specific position in the display and for handling the touch detected in the display as a touch of the specific position.

A method for operating an electronic device includes displaying a plurality of objects on a screen, detecting a movement of an eye pupil through a camera in an eye tracking mode, moving an indicator on the screen according to the movement of the eye pupil, detecting a touch on a touch area, and in response to detecting the touch on the touch area, selecting an object on which the indicator is located, among the plurality of objects on the screen.

An electronic device includes a display configured to display displaying a plurality of objects on a screen, and a processor configured to detect a movement of an eye pupil through a camera in an eye tracking mode, move an indicator on the screen according to the movement of the eye pupil, detect a touch on the electronic device, and in response to detecting the touch, select an object on which the indicator is located, among the plurality of objects on the screen.

Before undertaking the DETAILED DESCRIPTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely. Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts:

FIGS. 8A and 8B illustrate operations based on a position of a pointer displayed on a display in an electronic device according to various exemplary embodiments;

DETAILED DESCRIPTION

Figure 1:
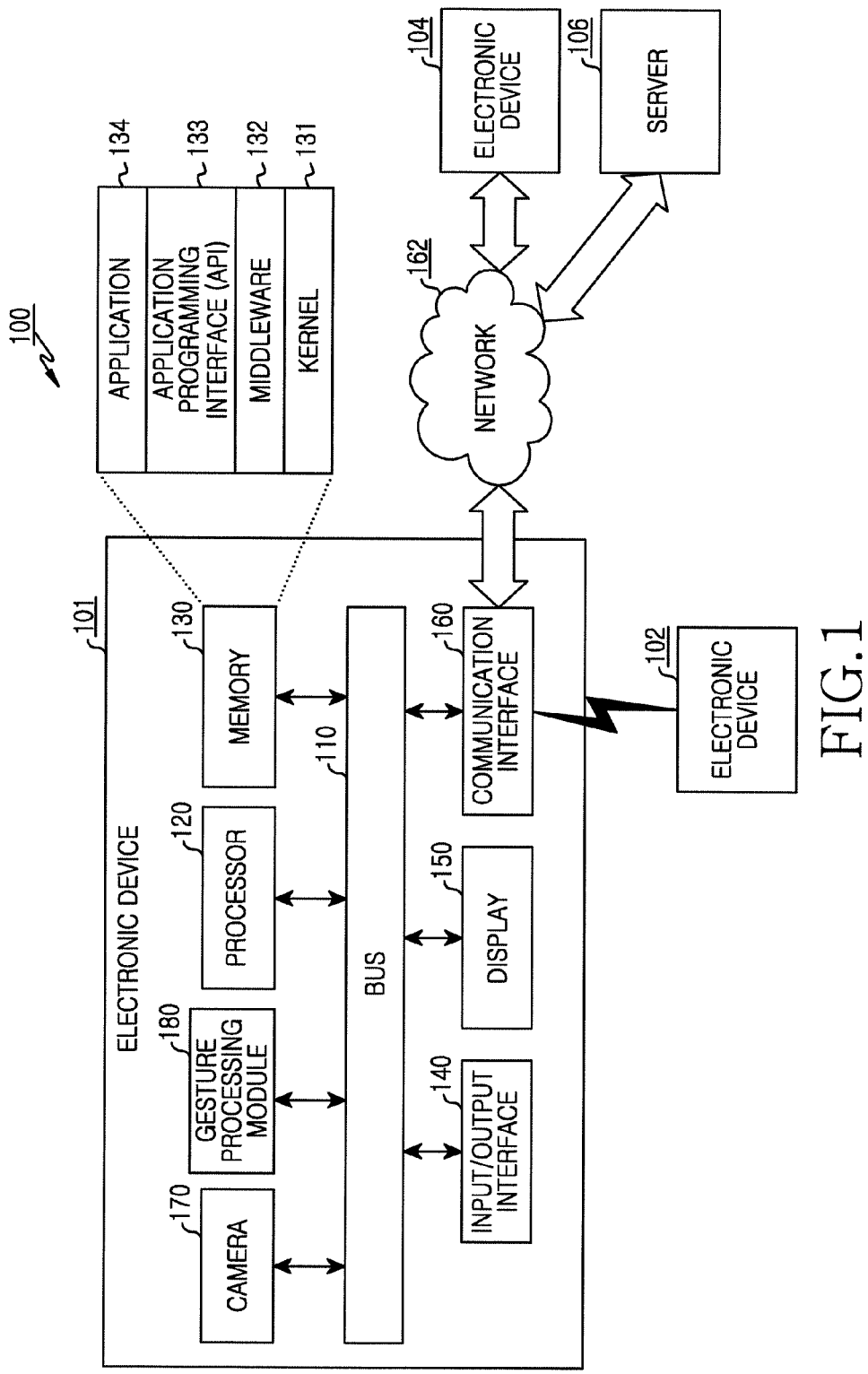
FIG. 1 illustrates a network environment including an electronic device according to various exemplary embodiments.

FIGS. 1 through 10, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged electronic devices. Hereinafter, various exemplary embodiments of the present disclosure are described with reference to the accompanying drawings.

While the various exemplary embodiments of the present disclosure are susceptible to various modifications and alternative forms, a specific embodiment thereof has been shown by way of example in the drawings and will herein be described in detail. It should be understood, however, that it is not intended to limit the various exemplary embodiments of the present disclosure to the particular form disclosed, but, on the contrary, the various exemplary embodiments of the present disclosure are to cover all modifications and/or equivalents and alternatives falling within the spirit and scope of the various exemplary embodiments of the present disclosure as defined by the appended claims. Like reference numerals denote like constitutional elements throughout the drawings.

In various exemplary embodiments of the present disclosure, an expression "or" includes any and all combinations of words enumerated together. For example, "A or B" may include A or B, or may include both of A and B.

Although expressions used in various exemplary embodiments of the present disclosure such as "$1^{st}$", "$2^{nd}$", "first", "second" may be used to express various constitutional elements of the various exemplary embodiments, it is not intended to limit the corresponding constitutional elements. In addition, the above expressions may be used to distinguish one constitutional element from another constitutional element. In addition, when a constitutional element is mentioned as being "connected" to or "accessing" another constitutional element, this may mean that it is directly connected to or accessing the other constitutional element, but it is to be understood that there are no intervening constitutional elements present. On the other hand, when a constitutional element is mentioned as being "directly connected" to or "directly accessing" another constitutional element, it is to be understood that there are no intervening constitutional elements present.

Terms used in various exemplary embodiments of the present disclosure are for the purpose of describing particular exemplary embodiments only and are not intended to be limiting of the various exemplary embodiments of the present disclosure. A singular expression includes a plural expression unless there is a contextually distinctive difference therebetween.

Unless otherwise defined, all terms (including technical and scientific terms) used herein have the same meaning as commonly understood by those ordinarily skilled in the art to which various exemplary embodiments of the present disclosure belong. It will be further understood that terms, such as those defined in commonly used dictionaries, should be interpreted as having a meaning that is consistent with their meaning in the context of the relevant art and the various exemplary embodiments of the present disclosure, and will not be interpreted in an idealized or overly formal sense unless expressly so defined herein.

According to various exemplary embodiments, the electronic device may be a device including a communication function. For example, the electronic device may include at least one of a smart phone including a communication function, a tablet Personal Computer (PC), a mobile phone, a video phone, an e-book reader, a desktop PC, a laptop PC, a netbook computer, a Personal Digital Assistant (PDA), a Portable Multimedia Player (PMP), a MPEG-1 Audio Layer 3 (MP3) player, a mobile medical device, a camera, a wearable device (e.g., a Head-Mounted-Device (HMD) such as electronic glasses, electronic clothes, an electronic bracelet, an electronic necklace, an electronic accessory, an electronic tattoo, or a smart watch), a television (TV), a Digital Video Disk (DVD) player, an audio, a refrigerator, an air conditioner, a cleaner, an oven, a microwave oven, a washing machine, an air purifier, a set-top box, a TV box (e.g., Samsung HomeSync™, Apple TV™, or Google TV™), a game console, an electronic dictionary, an electronic key, a camcorder, medical devices (e.g., Magnetic Resonance Angiography (MRA), Magnetic Resonance Imaging (MRI), Computed Tomography (CT), imaging equipment, ultrasonic instrument, etc.), a navigation device, a Global Positioning System (GPS) receiver, an Event Data Recorder (EDR), a Flight Data Recorder (FDR), a car infotainment device, an electronic equipment for ship (e.g., a vessel navigation device, a gyro compass, etc.), avionics, a security device, an industrial or domestic robot, a furniture or a part of building/constructions including a communication function, an electronic board, an electronic signature input device, a projector, and various measurement machines (e.g., water supply, electricity, gas, propagation measurement machine, etc.). The electronic device according to the present disclosure may be one or more combinations of the aforementioned various devices. In addition, it is apparent those ordinarily skilled in the art that the electronic device according to the present disclosure is not limited to the aforementioned devices.

Hereinafter, an electronic device according to various exemplary embodiments will be described with reference to the accompanying drawings. The term 'user' used in the various exemplary embodiments may refer to a person who uses the electronic device or a device which uses the electronic device (e.g., an Artificial Intelligence (AI) electronic device).

FIG. 1 illustrates a network environment including an electronic device according to various exemplary embodiments.

Referring to FIG. 1, an electronic device 101 can include a bus 110, a processor 120, a memory 130, an input/output interface 140, a display 150, a communication interface 160, a gesture processing module 180, a microphone, and a speaker.

The bus 110 can be a circuit for connecting the aforementioned constitutional elements to each other and for delivering a communication signal (e.g., a control message) between the aforementioned constitutional elements.

The processor 120 can receive an instruction from the aforementioned different constitutional elements (e.g., the memory 130, the input/output interface 140, the display 150, the communication interface 160, or the gesture processing module 180), for example, via the bus 110, and thus can interpret the received instruction and execute arithmetic or data processing according to the interpreted instruction.

The memory 130 can store an instruction or data received from the processor 120 or different constitutional elements (e.g., the input/output interface 140, the display 150, the communication interface 160, or the gesture processing module 180) or generated by the processor 120 or the different constitutional elements. The memory 130 can include programming modules such as a kernel 131, a middleware 132, an Application Programming Interface (API) 133, an application 134, and the like. Each of the aforementioned programming modules can consist of software, firmware, or hardware entities or can consist of at least two or more combinations thereof.

The kernel 131 can control or manage the remaining other programming modules, for example, system resources (e.g., the bus 110, the processor 120, the memory 130, etc.) used to execute an operation or function implemented in the middleware 132, the API 133, or the application 134. In addition, the kernel 131 can provide a controllable or manageable interface by accessing individual constitutional elements of the electronic device 101 in the middleware 132, the API 133, or the application 134.

The middleware 132 can perform a mediation role so that the API 133 or the application 134 communicates with the kernel 131 to exchange data. In addition, regarding task requests received from the application 134, for example, the middleware 132 can perform a control (e.g., scheduling or load balancing) for the task requests by using a method of assigning a priority capable of using a system resource (e.g., the bus 110, the processor 120, the memory 130, etc.) of the electronic device 101 to at least one of the applications 134.

The API 133 can include at least one interface or function (e.g., instruction) for file control, window control, video processing, character control, and the like, as an interface capable of controlling a function provided by the application 134 in the kernel 131 or the middleware 132.

The application 134 can be an application related to an information exchange between the electronic device 101 and an external electronic device (e.g., an electronic device 102, an electronic device 103, or an electronic device 104). The application related to the information exchange can include, for example, a notification relay application for relaying specific information to the external electronic device or a device management application for managing the external electronic device. According to various exemplary embodiments, the application 134 can include an application additionally designated according to attribute information (e.g., an electronic device type) of the external electronic device (e.g., the electronic device 102, the electronic device 103, or the electronic device 104).

The input/output interface 140 can relay an instruction or data input from a user via a sensor (e.g., an acceleration sensor, a gyro sensor) or an input/output device (e.g., a keyboard, or a touch screen) to the processor 120, the memory 130, the communication interface 160, or the gesture processing module 180, for example, via the bus 110. For example, the input/output interface 140 can provide data regarding a user's touch input via the touch screen to the processor 120. In addition, the input/output interface 140 can output an instruction or data received from the processor 120, the memory 130, the communication interface 160, or the gesture processing module 180 to an output device (e.g., a speaker or a display), for example, via the bus 110. For example, the input/output interface 140 can output audio data provided by using the processor 120 to the user via the speaker.

The display 150 can display a variety of information (e.g., multimedia data or text data) to the user. The display 150 can consist of a touch screen for inputting an instruction by touching or proximity touching an input means to the display. The touch screen can include a touch panel so that an input function and a display function can be performed simultaneously. The touch panel can include a Liquid-Crystal Display (LCD) or an Active-Matrix Organic Light-Emitting Diode (AM-OLED), and can be implemented in a flexible, transparent, or wearable manner. The touch panel can recognize a touch input by using at least one of an electrostatic type, a pressure-sensitive type, and an ultrasonic type. The touch panel can further include a controller. In case of the electrostatic type, the touch panel can recognize not only a direct touch but also a proximity touch. The proximity touch is also expressed as a non-contact touch or hovering. The touch penal can further include a tactile layer to provide the user with a tactile reaction. The touch screen can include a hologram. The hologram can use an interference of light and show a stereoscopic image in the air. In addition, the touch screen can further include a control circuit for controlling the touch panel or the hologram. Unless otherwise specified in particular in the following description, the touch screen and the touch panel can be represented by the display 150. A device area for displaying a variety of information can be designated as a screen in the display 150. The electronic device 101 can use at least some areas of the touch panel as an input area (or a touch area). If the input area which operates on a touch basis is configured to the display 150, the electronic device 101 can determine the input area distinctively at a designated position in the touch panel of the touch screen, and can display the configured input area to the display 150.

The communication interface 160 can connect a communication between the electronic device 101 and an external device (e.g., the electronic device 102, the electronic device 103, the electronic device 104, or the server 106). For example, the communication interface 160 can support a network communication 162 (e.g., Internet, Local Area Network (LAN), Wide Area Network (WAN), telecommunication network, cellular network, satellite network, Plain Old Telephone Service (POTS), etc.) and a near distance communication 164 (e.g., Wireless Fidelity (WiFi), Bluetooth (BT), Near Field Communication (NFC), or wired communication (e.g., Universal Serial Bus (USB), High Definition Multimedia Interface (HDMI), Recommended Standard (RS)-232, POTS, etc.). According to one exemplary embodiment, a protocol for a communication between the electronic device 101 and the external device (e.g., a near distance communication protocol, a network communication protocol, or a wired communication protocol) can be supported in at least one of the API 133 and the middleware 132. Each of the electronic devices 102, 103, and 104 can be a device which is the same (e.g., the same type) as the electronic device 101 or can be a different (e.g., a different type) device.

One or more cameras 170 can be included at a designated position of a front portion of the electronic device 101. The camera 170 can confirm a user's eye pupil movement, and can determine a designated position of the display 150 gazed by the eye pupil by using a database in association with the eye pupil movement. The electronic device 101 can display a pointer which indicates an object displayed on the display 150 at the designated position of the display 150 gazed by the eye pupil.

The gesture processing module 180 can process at least a part of information acquired from other constitutional elements (e.g., the processor 120, the memory 130, the input/output interface 140, the communication interface 60, etc.), and can provide it to the user in various manners. For example, the gesture processing module 180 can control at least a part of functions of the electronic device 101 so that the electronic device 101 interworks with other electronic devices (e.g., the electronic device 102, the electronic device 103, and the electronic device 104, or the server 106) by using the processor 120 or independently.

The gesture processing module 180 can display a specific position in the display, and can handle a touch detected in the display as a touch of the specific position. The gesture processing module 180 can determine a coordinate associated with the display as the specific position based on an eye pupil or a movement of the eye pupil. The gesture processing module 180 can be a device for displaying at least one of a pointer, an identifier, and an indicator at the specific position or for displaying a state where an object associated with the specific position is selected. The gesture processing module 180 can handle the detected touch as a touch at a coordinate associated with the specific position. The gesture processing module 180 can handle a touch detected at the specific position or at a portion of a display other than the specific position as the detected touch. The gesture processing module 180 can handle a touch detected in an input area configured in at least a portion of the display as the touch of the specific position. The gesture processing module 180 can determine a single touch or a touch including a drag as the detected touch. The gesture processing module 180 can configure a layer for displaying a specific position and a layer for inputting a touch as different layers. The gesture processing module 180 can handle a touch detected in a touch panel operatively connected with the display as the touch of the specific position. Instead of handling the touch detected at the position of the display in which the detected touch occurs, the gesture processing module 180 can handle it as the touch of the specific position.

The gesture processing module 180 can display a pointer display area and an input area to the display by distinguishing the areas. A pointer can be displayed on the pointer display area, and a touch detected in the input area can be handled as a touch at a position at which the pointer is displayed.

The gesture processing module 180 can determine the input area at a designated position of the display which can be easily touched by a designated finger if the electronic device is gripped by one hand. The gesture processing module 180 can display the input area based on setup information including at least one of position, shape, and size information of the input area. When the input area is displayed, the gesture processing module 180 can determine at least one of a position, shape, and size of the input area by touching or dragging the display in which the input area is displayed. The gesture processing module 180 can change a position of an input area previously displayed on the display based on a designated input. If a pointer is located in the input area, the gesture processing module 180 can release the display of the input area. The gesture processing module 180 can display the input area to a layer different from the layer to which the pointer area is displayed. The gesture processing module 180 can detect from the input area a gesture designated to execute at least one function by touching the display. If the touch is detected from the pointer display area, the gesture processing module 180 can release the display of the pointer display area and the input area. The gesture processing module 180 can additionally determine the input area in a touch panel operatively coupled to the display to which the pointer display area is displayed. The gesture processing module 180 can display a pointer based on a user's eye pupil movement. The pointer can be displayed in an overlapping manner on at least one of icons displayed on the display.

The gesture processing module 180 can include a processor for displaying a pointer to a display, for detecting a touch in an input area independent of the display, and for handling a touch detected in the input area as a touch of a position at which the pointer is displayed. Herein, the pointer displayed on the display can be moved based on an eye pupil movement. The gesture processing module 180 can determine a touch panel formed independently in a rear portion of the display as the input area. An operation of the gesture processing module 180 can be performed by at least one processor 120, or can be performed by the gesture processing module 180 under the control of the processor 120.

Figure 2:
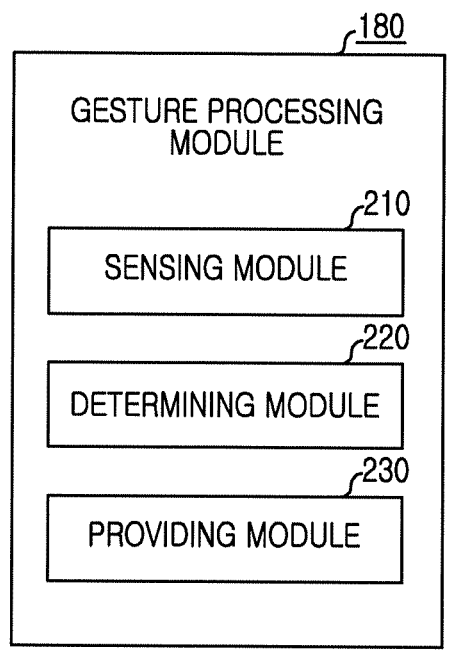
FIG. 2 is a block diagram of a gesture processing module of an electronic device according to various exemplary embodiments.

FIG. 2 is a block diagram of a gesture processing module of an electronic device according to various exemplary embodiments. Referring to FIG. 2, the gesture processing module 180 can include one or more of a sensing module 210, a determining module 220, and a providing module 230.

The sensing module 210 can sense various gestures which are input to the electronic device 101. According to one exemplary embodiment, the sensing module 210 can detect a user's eye pupil movement by using the camera 170 included in the electronic device 101. The sensing module 210 can detect an input of an operation designated in the electronic device 101, such as a touch, a touch-and-hold, or a touch-and-drag, to a display to which a touch input is achieved by using one or more designated input means.

The determining module 220 can determine an operation associated with the various gestures which are input to the electronic device 101. The determining module 220 can further determine a touch which is input to the display 150 of the electronic device 101 as a touch of a specific position (e.g., a pointer displayed on the display 150 in association with an eye pupil or a movement of the eye pupil) of the display 150 by using setup information of an eye pupil sensing mode. The determining module 220 can determine an input area according to a gesture which is input to the display 150 at a time of entering the eye pupil sensing mode.

The providing module 230 can perform a function associated with one or more objects selected in the display 150 by referring to the gesture which is input to the electronic device 101. The providing module 230 can display a pointer which indicates an object displayed on the display 150 at a designated position of the display 150 gazed by the user's eye pupil sensed by using the camera 170. The providing module 230 can provide a function of an object indicated by a pointer displayed on the display 150 in association with the gesture which is input to the input area displayed on the display 150.

Figure 3A:
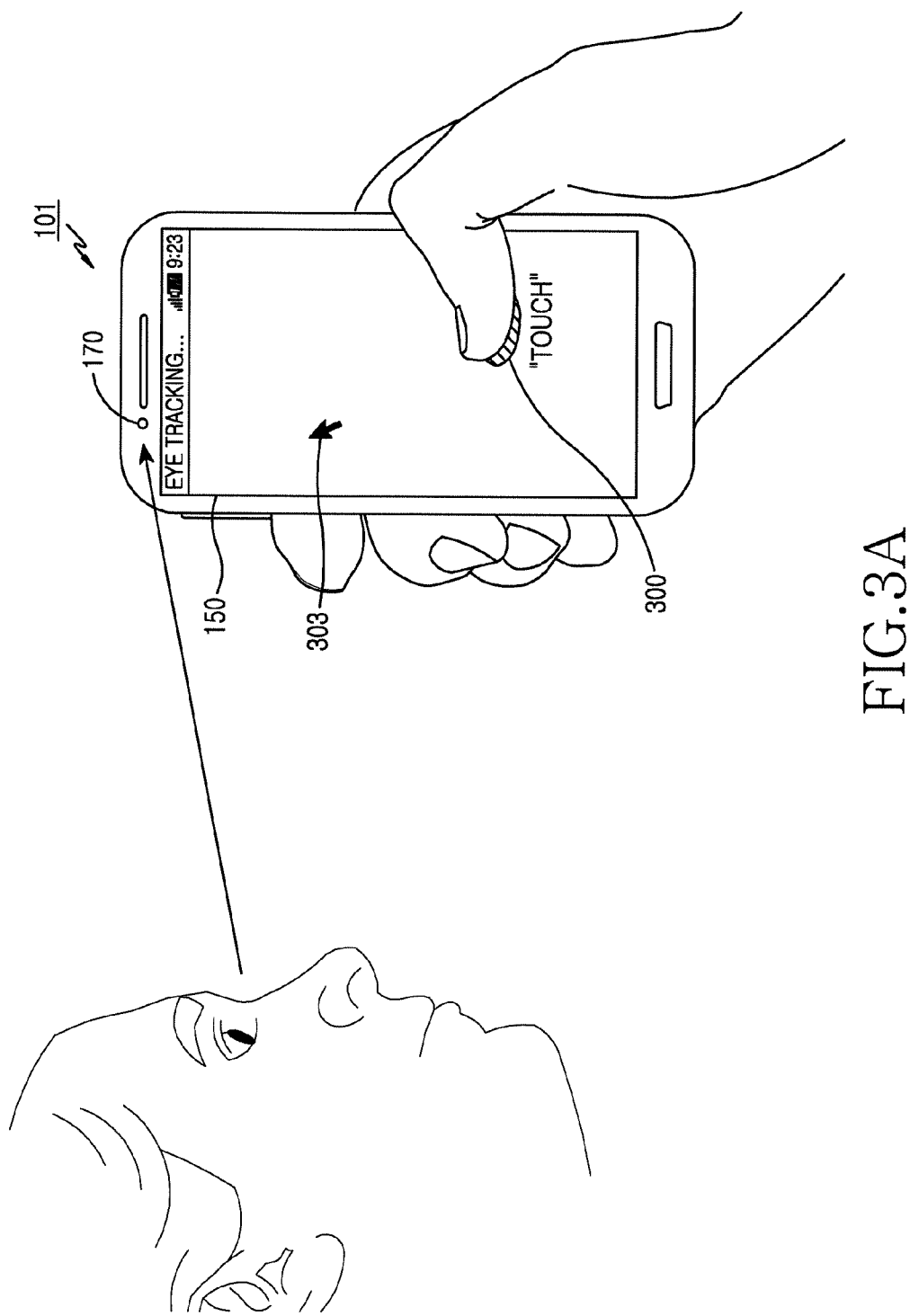
FIG. 3A and FIG. 3B illustrate the operations of selecting an object by processing a user's eye pupil in an electronic device according to various exemplary embodiments.
Figure 3B:
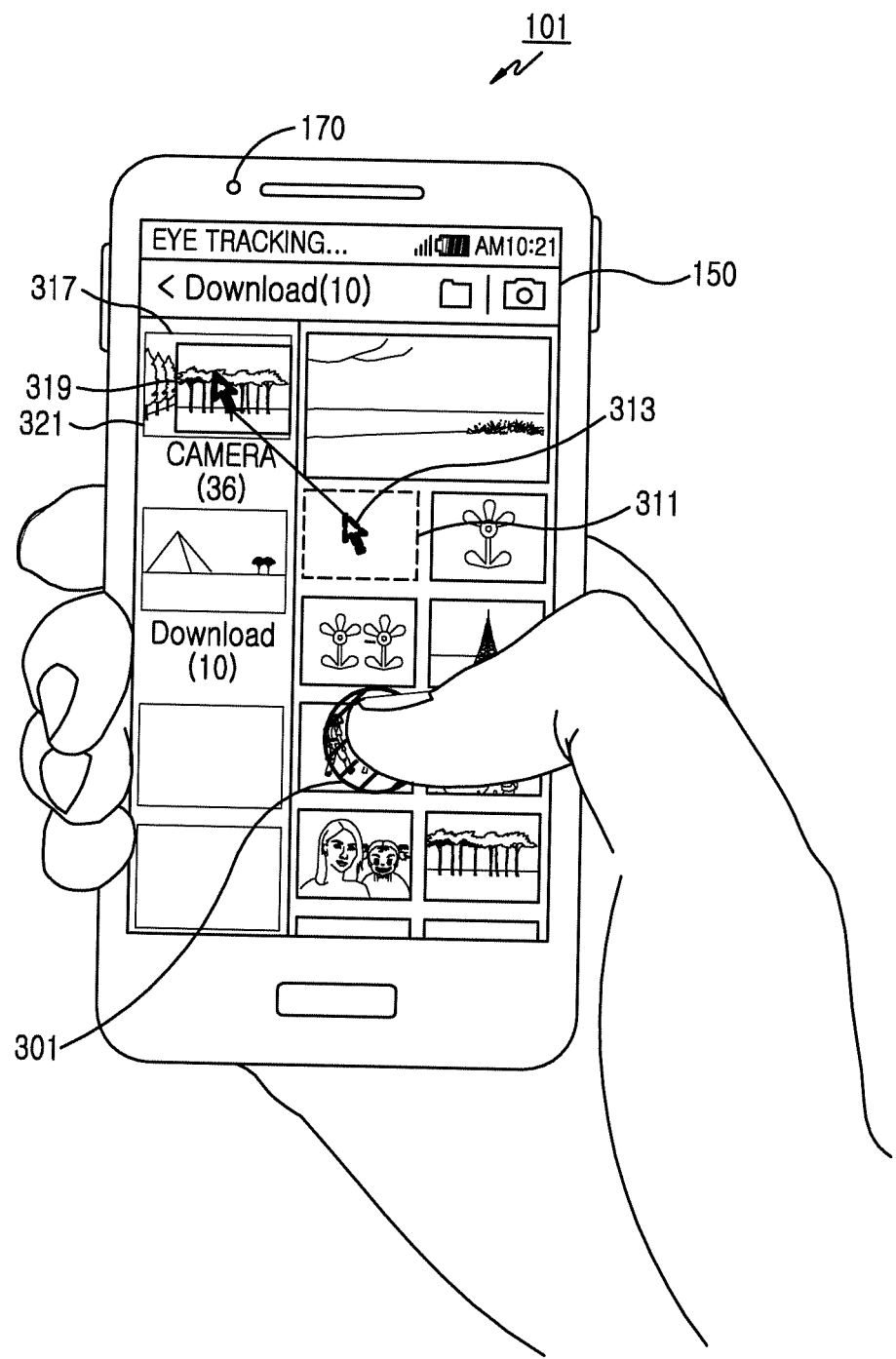

FIG. 3A and FIG. 3B illustrate an operation of selecting an object by processing a user's eye pupil in an electronic device according to various exemplary embodiments.

When the electronic device 101 enters an eye pupil sensing mode, the electronic device 101 can display a designated pointer at a position of an eye gaze of a user of the display 150 of the electronic device 101 by sensing a user's eye pupil through the camera 170. The electronic device 101 can display information regarding a movement of the user's eye pupil through the camera 170 by matching to a virtual coordinate configured in the display 150, and can move a pointer displayed on the display 150 according to the movement of the eye pupil. An operation of moving the pointer displayed on the display 150 according to the movement of the eye pupil in the electronic device 101 can use an eye pupil tracking (or eye tracking) technique which is used in general. Herein, the pointer displayed on the display 150 based on the eye pupil can be used in the meaning of an identifier or an indicator which represents a specific position of the display 150 and which is used in the electronic device 101. Further, when the electronic device 101 displays the pointer to the display 150, it can be used in a sense that an object displayed at the specific position of the display 150 is determined in a designated state (e.g., a selected state or an activation state).

Hereinafter, various exemplary embodiments of the present disclosure are described with reference to FIG. 3A.

The electronic device 101 can move a pointer 303 according to an eye gaze of a user at a designated position of the display 150 by tracking an eye pupil movement through the camera 170, and a user can touch a designated area of the display 150 to perform a function of the electronic device 101 in association with an object indicated by the pointer 303 displayed on the display 150 based on a touch operation.

The display 150 of the electronic device 101 can perform an operation of an input device for controlling the pointer 303 on the display 150. For example, in the eye pupil sensing mode of the electronic device 101, an area of the pointer 303 which indicates the designated position can be displayed on the display 150 based on the movement of the eye pupil, and a gesture which is input to the display 150 by a touch can be handled as being an input to the pointer of the display 150. Herein, the display 150 can be defined as an input area when a touch detected in the display 150 is handled as an input of the pointer displayed on the display 150.

When the electronic device 101 determines an area of the pointer 303 or an input area to the display 150 in the eye pupil sensing mode, it can be determined in an additional layer (e.g., a second layer) which is different from a layer (e.g., a first layer) in which one or more objects displayed on the display 150 are located. The electronic device 101 can display the input area in the additional layer, and can handle a gesture of a designated position (e.g., an area 300 for detecting a touch) of the input area as a gesture for a designated object of the first layer indicated by a pointer displayed on the display 150 other than a gesture for the first layer displayed at a position at which the touch is detected.

According to one exemplary embodiment, upon sensing a touch input (e.g., a single touch) detected in the display 150 (e.g., the designated position 300 of the display 150 as illustrated in FIG. 3A), the electronic device 101 can handle it as that a single touch is performed on an object (or a target) indicated by the pointer 303 displayed on the designated position of the display 150.

According to one exemplary embodiment, when the electronic device 101 is gripped by one hand of a user, in order to perform an input at the designated position of the display 150, which is not easily touched by a designated finger (e.g., a thumb or an index finger), in the display 150 of the electronic device 101, a pointer which indicates a specific position can be displayed on the display 150, and a touch input detected in the display 150 can be handled as being input to the pointer displayed on the display 150.

The electronic device 101 can determine an input area for detecting a touch by limiting to the designated area of the display 150 in the eye pupil sensing mode in which the touch detected in the display 150 is handled to be performed at the pointer displayed on the display 150. According to one exemplary embodiment, when the electronic device 101 determines the input area of the display 150, if the electronic device 101 is gripped by a right hand, an area (e.g., a part of a right lower area of the display 150) in which the display 150 can be easily touched by a thumb can be determined as the input area. If the electronic device 101 detects a touch in the input area determined in the right lower portion of the display 150, the detected touch can be handled as the touch detected at the pointer displayed on the display 150.

The electronic device 101 can determine the input area at a position (e.g., the position 300 at which the touch is detected in the display 150 of FIG. 3A) which can be easily touched by a finger (e.g., a thumb or an index finger) as the input area. The input area for detecting a touch gesture which handles a sensed touch as a touch of the pointer of the display 150 can be displayed based on setup information (e.g., setup information of the eye pupil sensing mode) or may not be displayed. Although it is described hereinafter that the determined input area is displayed in the display 150 of the electronic device 101, apparently, the present disclosure is not limited that the input area must to be displayed.

According to various exemplary embodiments, the electronic device 101 can detect a movement of the user's eye pupil through the camera 170, and can move a pointer at a position of the display 150 according to an eye gaze of the user. The electronic device 101 can move the pointer displayed on the display 150 in association with the movement of the user's eye pupil, and can detect a touch input within the input area marked on the display 150. When the electronic device 101 detects a touch within the input area displayed on the display 150, the touch input within the input area can be handled as a touch on an object pointed by the pointer, instead of a touch on its physical touch point.

According to the aforementioned exemplary embodiment, when a touch operation of the display 150 is performed by using a hand which grips the electronic device 101 in a state where the electronic device 101 is gripped by one hand of the user, there can be an area which cannot be easily touched by a designated finger (e.g., a thumb or an index finger) of the hand which grips the electronic device 101. The electronic device 101 can provide a function of easily performing an operation associated with a touch in the area which cannot be easily touched by the designated finger (e.g., the thumb or the index finger) of the hand which grips the electronic device 101, by using a pointer which moves based on a movement of an eye pupil and which is displayed on the display 150 and an input area displayed on the display 150 which operates based on a touch.

According to various exemplary embodiments, the input area of the display 150 may not be explicitly distinctive in the electronic device 101. For example, if an entire area of the display 150 is determined as the input area. In this case, the pointer can be displayed on the input area (e.g., the display 150) and thus a touch detected in a portion of the input area can be handled as a touch detected at the pointer.

According to various exemplary embodiments, the electronic device 101 can divide at least a portion of the area of the display 150 into a pointer display area which is an area for displaying a pointer based on a movement of an eye pupil (e.g., a designated area of the display 150 for performing a function of detecting the movement of the eye pupil and displaying the pointer at a position determined as being gazed by the eye pupil) and an input area which detects a touch input handled as being input at a position of a pointer currently displayed on the pointer display area of the display 150. According to one exemplary embodiment, the electronic device 101 can determine the input area in the display 150, and can determine the remaining areas other than the determined input area as the pointer display area. Alternatively, the remaining areas other than the determined area of the pointer or a part of the remaining areas can be determined as the input area. In various exemplary embodiments of the present disclosure described below, the pointer can move based on the movement of the eye pupil in a state where the electronic device 101 is gripped by one hand (e.g., the eye pupil sensing mode) as described above, and the touch area can detect a touch in association with the pointer driven by the movement of eye pupils.

Hereinafter, various exemplary embodiments of the present disclosure are described with reference to FIG. 3B.

A user can touch on an input area 301 of the display 150 to perform a function of the electronic device 101 to select an object indicated by a pointer displayed on the display 150.

The electronic device 101 can select one of images (e.g., an image 311) displayed in an album program and can display it on a designated area of the display 150. Upon entering an eye pupil sensing mode, the electronic device 101 can display an input area 310 to the designated area of the display 150. The electronic device 101 can sense a movement of a user's eye pupil through the camera 170, and can display a pointer at a position of the display 150 according to an eye gaze. The electronic device 101 can sense a user's eye pupil which gazes an object (i.e., the image 311) displayed on the display 150, and can display a pointer 313 which indicates a position gazed by the user's eye in the object (e.g., the image 311) displayed on the display 150. The electronic device 101 can input a gesture for selecting the object (e.g., the image 311) displayed on the display 150 to the input area 301 of the display 150 and thus can select an object indicated by the pointer displayed on the display 150. According to one exemplary embodiment, by performing a gesture (e.g., a single touch) for executing a designated object among objects displayed on the display 150 of the electronic device 101, the object (e.g., the image 311) indicated by the pointer 31 can be executed (e.g., displayed at a designated area of the display 150) in the display 150.

According to another exemplary embodiment, upon entering the eye pupil sensing mode, the electronic device 101 can distinguish the input area 301 of the display 150. The electronic device 101 can sense a user's eye pupil which gazes a designated object (e.g., the image 311) of the display 150 through the camera 170, and can display the pointer 313 which indicates the designated object (e.g., the image 311) of the display 150. The electronic device 101 can select the object (e.g., the image 311) indicated by the pointer 313 by performing a gesture (e.g., a touch or a touch-and-hold for more than a designated time), which selects the designated object to move among objects displayed on the display 150, in the input area 301 of the display 150. The electronic device 101 can sense a movement of the user's eye pupil through the camera 170 in a state of selecting the designated object (e.g., the image 311), and can move the pointer displayed on the display 150 of the electronic device 101 or the object (e.g., the image 311) selected by the pointer according to the movement of the user's eye gaze.

According to one exemplary embodiment, the electronic device 101 can sense that a user's eye gaze sensed through the camera 170 moves to a camera folder 317 of an album program displayed on the display 150, and can display (see 321) a pointer 319 and the selected object (e.g., the image 311) at a designated position of the camera folder 317 of the display 150 gazed by the user's eye pupil. The electronic device 101 can release a touch on an object selected through a touch or through an input of a touch-and-hold gesture to perform a gesture associated with an completion of moving to a position to which the object is moved by releasing a touch on an input means in a touch and touch-hold state in the input area 310 of the display 150, and can move the selected and moved object (e.g., the image 311) to the camera folder 317 indicated by the pointer 319 moved through eye pupil sensing.

Figure 4:
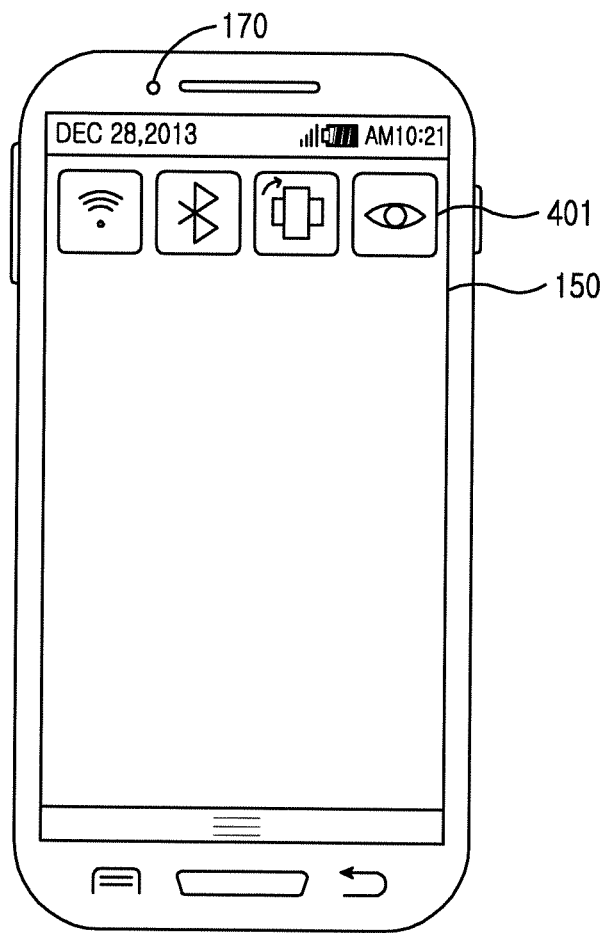
FIG. 4 illustrates an operation of entering an eye pupil sensing mode in an electronic device according to various exemplary embodiments.

FIG. 4 illustrates the operation of entering an eye pupil sensing mode in an electronic device according to various exemplary embodiments.

The electronic device 101 can execute the eye pupil sensing mode by using a method designated by a user in a setup mode of the eye pupil sensing mode. According to one exemplary embodiment, the electronic device 101 can display an icon 401 in a notification area by using a designated method and is displayed on the display 150. If the icon 401 indicating the eye pupil sensing mode is selected, the electronic device 101 can display an input area to a designated area of the display 150. The electronic device 101 can handle a gesture which is input to an input area displayed on the display 150 as a gesture which is input to a pointer displayed on the display 150. According to one exemplary embodiment, if the electronic device 101 selects an icon (e.g., the icon 401) associated with an eye pupil sensing mode in a state where a user's eye pupil gazes the camera 170, the input area can be displayed on the designated area of the display 150, and a pointer which indicates the designated position of the display 150 can be displayed by sensing a user's eye gaze.

FIG. 5A to FIG. 5E illustrate the setup operation of the eye pupil sensing mode in an electronic device according to various exemplary embodiments.

The electronic device 101 can perform an operation of a pointer displayed on the display 150 and can perform a setup for an input area through a setup mode of the eye pupil sensing mode. The input area of the display 150 of the electronic device 101 can be stored in setup information of the setup mode of the eye pupil sensing mode and thus the input area determined based on the setup information can be displayed on the display 150 when the electronic device 101 enters the eye pupil sensing mode. Further, the electronic device 101 can determine the input area of the display 150 at a time of entering the eye pupil sensing mode. Furthermore, the electronic device 101 can change a position of the input area of the display 150 or a shape of the input area according to a user's selection during an operation of the eye pupil sensing mode.

Figure 5A:
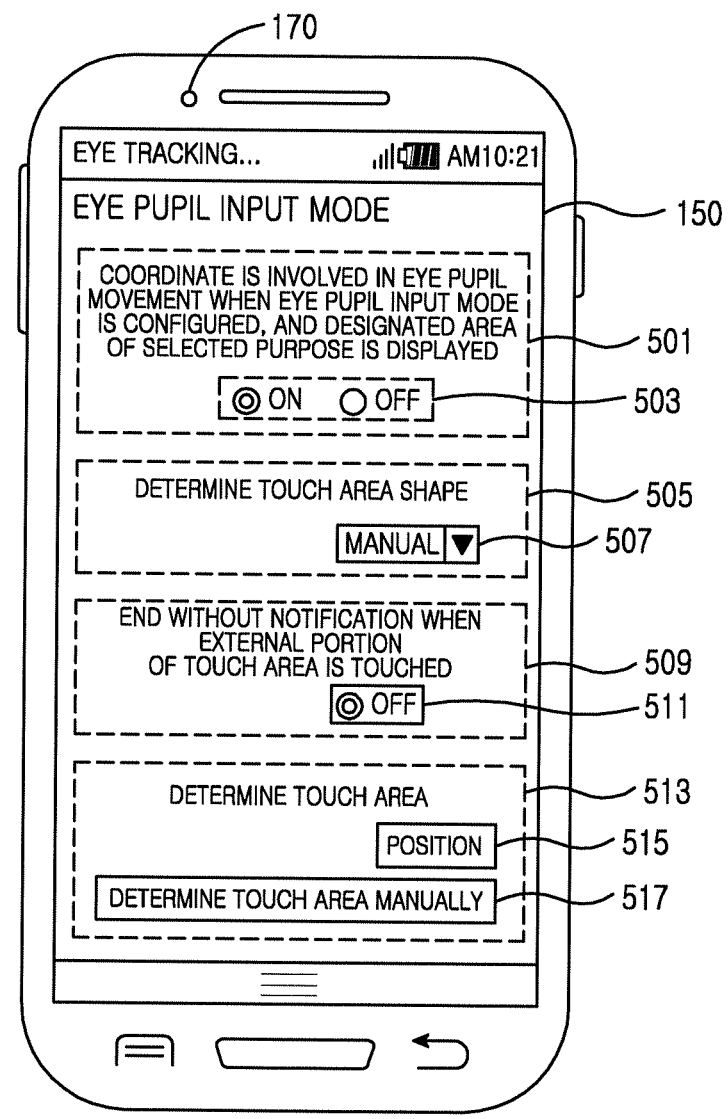
FIGS. 5A to 5E illustrate a setup operation of an eye pupil sensing mode in an electronic device according to various exemplary embodiments.

Hereinafter, various exemplary embodiments of the present disclosure are described with reference to FIG. 5A.

The electronic device 101 can determine the shape and position of the input area of the display 150 by setting up the eye pupil sensing mode. According to one exemplary embodiment, the electronic device 101 can sense a user's eye pupil which gazes the display 150 of the electronic device 101 in the setup of the eye pupil sensing mode and can determine whether to use an eye pupil tracking mode which displays a pointer at a designated position of the display 150 gazed by the eye pupil. The electronic device 101 can provide a menu 501 for determining whether to move a pointer displayed on the display 150 by the movement of the eye pupil, and can provide a menu 503 capable of selecting On/Off. If On is selected, the electronic device 101 can display the pointer at the designated position of the display 150 gazed by the eye pupil.

The electronic device 101 can provide a menu 505 for determining the shape of the input area of the display 150 upon entering an eye pupil mode in the setup of the eye pupil sensing mode. The electronic device 101 can provide a menu capable of determining the shape of the input area of the display 150 in various shapes such as a triangle, a square, a circle, and a manual, and can provide a menu capable of determining a size.

The electronic device 101 can provide a menu 509 for determining a method of ending the eye pupil mode in the setup of the eye pupil sensing mode. According to one exemplary embodiment, the electronic device 101 can be configured to end the eye pupil sensing mode when an external portion of the input area of the display 150 is touched by using one or more input means in a state of the eye pupil sensing mode. When the external portion of the input area of the display 150 is touched and thus the eye pupil sensing mode ends, the electronic device 101 can provide a menu 511 to determine whether to display a notification for notifying the end of the eye pupil sensing mode or to end it without having to display the notification.

The electronic device 101 can provide a menu 513 for determining the input area on the display 150 in the setup of the eye pupil sensing mode. According to one exemplary embodiment, the electronic device 101 can provide a menu 515 capable of determining a position of an input area displayed at a designated position of the display 150, and can provide a menu 517 capable of determining an input area to be displayed on the display 150 if a shape of the input area is determined manually.

Figure 5B:
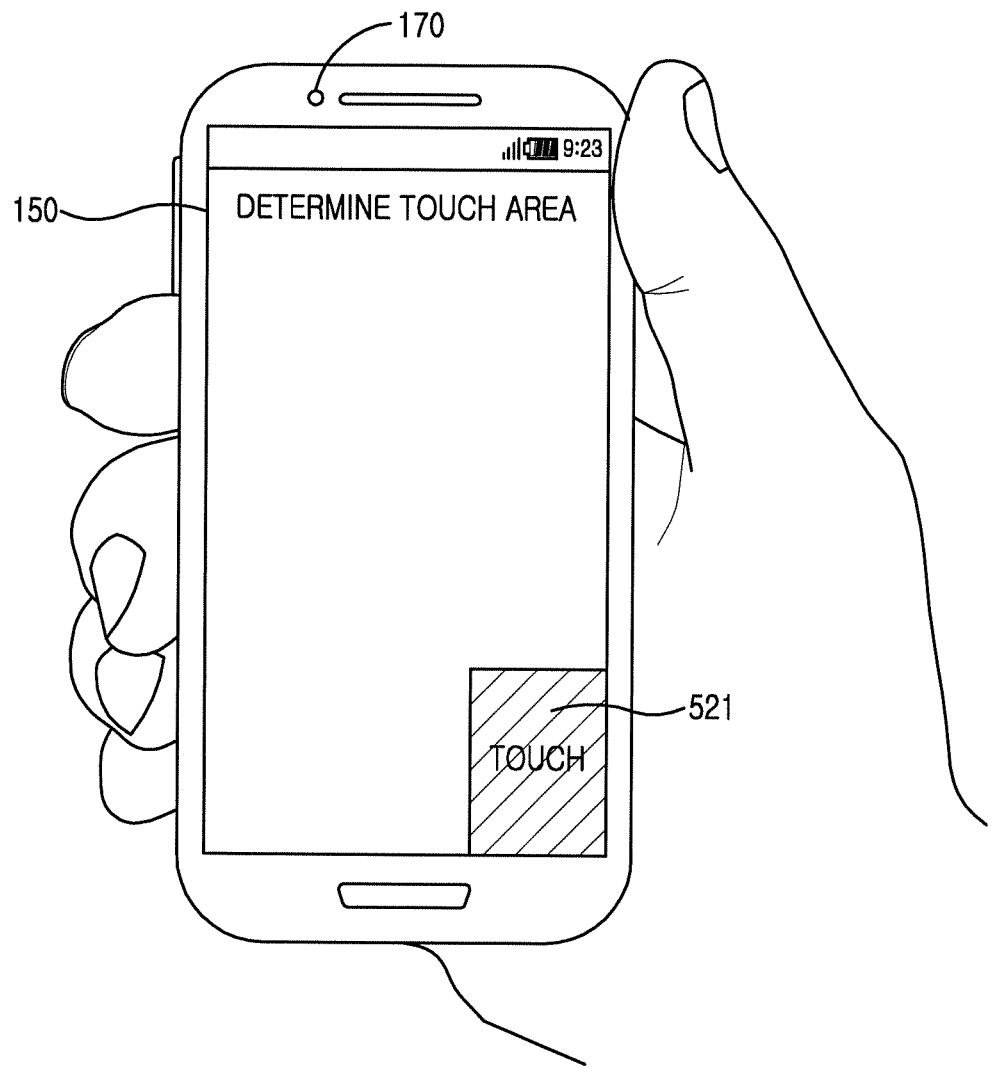

Hereinafter, various exemplary embodiments of the present disclosure are described with reference to FIG. 5B.

The electronic device 101 can determine a shape of an input area in which an input for an object indicated by a pointer on the display 150 is acquired upon entering an eye pupil sensing mode. According to one exemplary embodiment, the electronic device 101 can determine a square-shape input area 521 shown in FIG. 5B through a setup of the eye pupil sensing mode instead of being limited to a circular-shape input area of the display 150 (e.g., the input area 301 of FIG. 3A or the input area 301 of the FIG. 3B). The electronic device 101 can determine a width and/or a height of the square-shape input area of the display 150 through the setup, and can determine a designated position at which the input area is displayed on the display 150. The electronic device 101 can display two or more input areas at the designated position of the display 150 without being limited to display one input area 521 to the display 150. When the electronic device 101 determines the input area in the setup mode, a coordinate range can be input based on a coordinate system configured to the display 150 of the electronic device 101, and an input coordinate area can be determined as the input area.

When the electronic device 101 displays the determined input area to the display 150, the input area can be displayed on a layer different from a layer currently displayed on the display 150. According to one exemplary embodiment (FIG. 3B can be referred herein), when the electronic device 101 displays an album program (see FIG. 3B) to the display 150, the electronic device 101 can display the input area in a layer different from a layer in which the album program is displayed. The electronic device 101 can display the input area at a designated position of the layer currently displayed on the display 150 based on setup information of the eye pupil sensing mode. According to one exemplary embodiment, when the album program is currently displayed on the display 150, the electronic device 101 can split the layer in which the album program is displayed, and can display the input area in the split area.

Figure 5C:
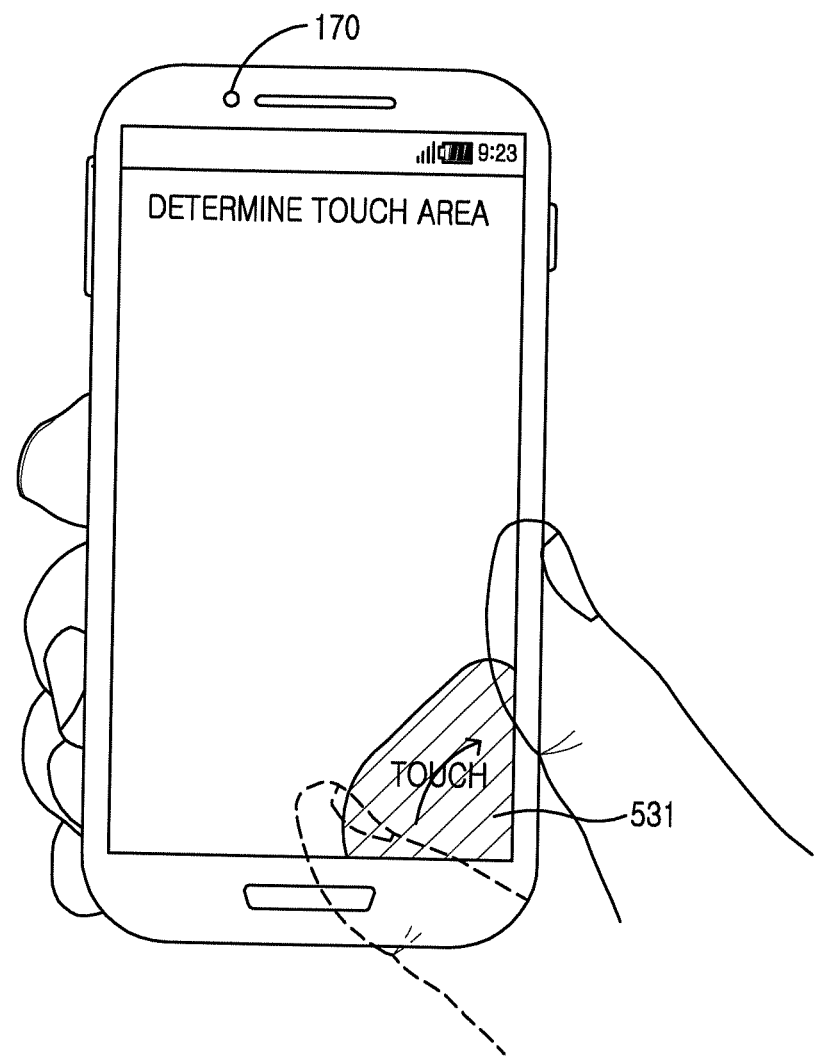

Hereinafter, various exemplary embodiments of the present disclosure are described with reference to FIG. 5C.

When the electronic device 101 determines a shape of the input area of the display 150 upon entering an eye pupil sensing mode, without being limited to a designated shape such as a circle, a triangle, a square, etc., a user can use an input means (e.g., a finger, etc.) to perform an input to the display 150 to determine the input area. According to one exemplary embodiment, the electronic device 101 can determine an area 531 which is drawn in a state of touching and touching-and-holding the display 150 as shown in FIG. 5C as an input area 531. The electronic device 101 can display the input area 531 to a designated area of the display 150 when executing the eye pupil sensing mode by storing the input area 531 determined as described above in the setup of the eye pupil sensing mode, or can determine the input area at a time of executing the eye pupil sensing mode.

Hereinafter, various exemplary embodiments of the present disclosure are described with reference to FIGS. 5D and 5E.

Figure 5E:
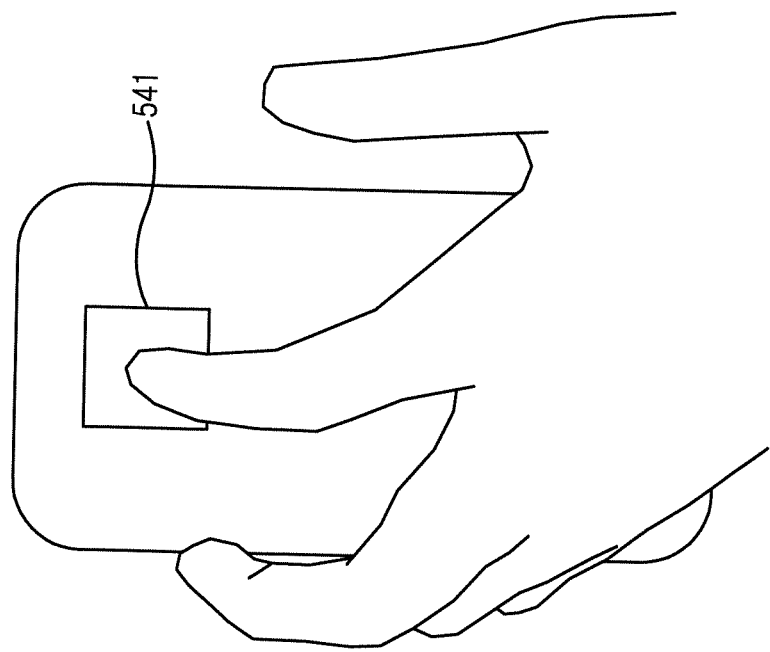
Figure 5D:
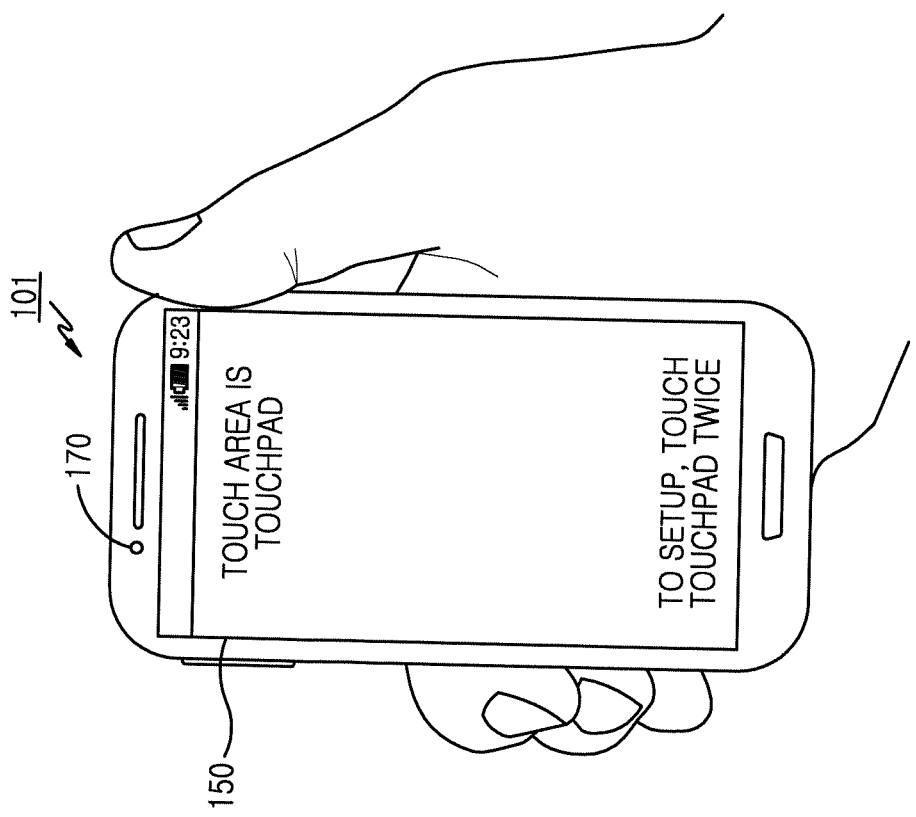

Referring to FIG. 5D, instead of determining a designated area of the display 150, the electronic device 101 can use an entire area of the display 150 as an area for displaying a pointer which is responsive to a movement of a user's eye pupil. The electronic device 101 can receive an input which functions at a pointer on the display 150 by using an input device included in the electronic device 101 in addition to the display 150.

Figure 6:
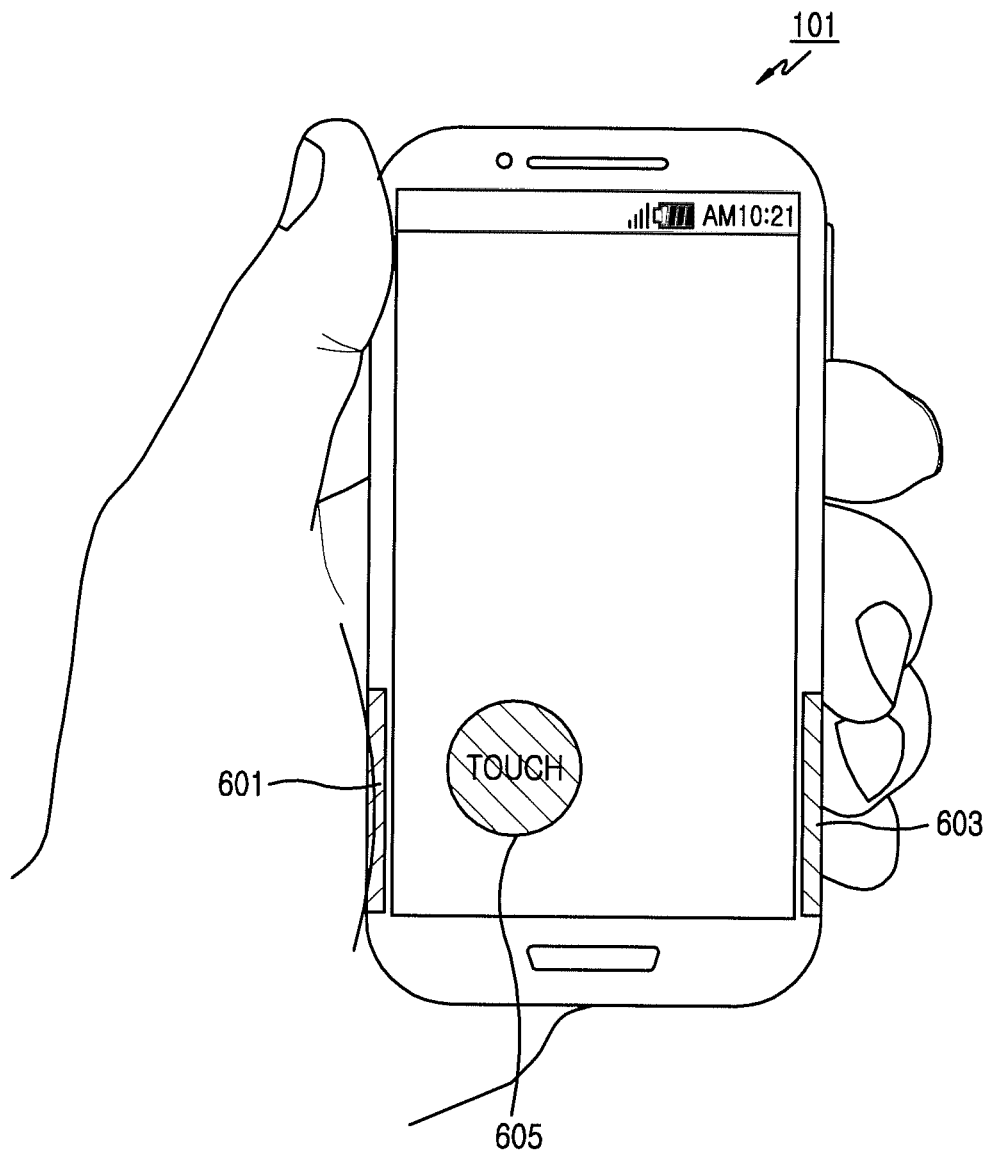
FIG. 6 illustrates an operation of determining a position of an input area of display in an electronic device according to various exemplary embodiments.

Referring to FIG. 5E, when gripped by one hand of a user, the electronic device 101 can include a touch input device (e.g., a touchpad, track pad, or touch sensor 541) at a designated position of the electronic device 101 (e.g., a position designated at a rear portion of the electronic device) in which a designated finger (e.g., an index finger) can be easily moved. The electronic device 101 can determine the input device (e.g., the touchpad or touch sensor 541) operatively coupled to the display 150 included in the electronic device 101 as an input area. According to one exemplary embodiment, the electronic device 101 can display an input area at a designated position of the display 150 of the electronic device 101 upon entering an eye pupil sensing mode. The electronic device 101 can release the display of the input area of the display 150 upon sensing a gesture which is input to the touchpad 541 operatively coupled to a touch screen and capable of performing a touch input, and can handle the gesture which is input to the touchpad 541 as a gesture which is input to a pointer on the display 150. FIG. 6 illustrates an operation of determining a position of an input area of a display in an electronic device according to various exemplary embodiments.

The electronic device 101 can include one or more grip sensors at a designated position outside the electronic device 101. The grip sensor included at the designated position outside the electronic device 101 can determine whether the user grips the electronic device 101 by using a left hand or a right hand. According to one exemplary embodiment, the electronic device 101 can include a first grip sensor 601 and a second grip sensor 603 at a designated position of the electronic device 101 as shown in FIG. 6. When it is sensed that the electronic device 101 is gripped by a user's hand, an area of the hand which grips the first grip sensor 601 and the second grip sensor 603 can be detected. If an area in contact with the first grip sensor 601 by the hand is greater than an area in contact with the second grip sensor 603, the electronic device 101 can determine that the electronic device 101 is gripped by the left hand of the user. If it is determined that the electronic device 101 is gripped by the left hand of the user, an input area 605 of the display 150 in the eye pupil sensing mode can be displayed at a position (e.g., a left or right to a center) designated as a left hand mode with respect to a center of the display 150.

Figure 7:
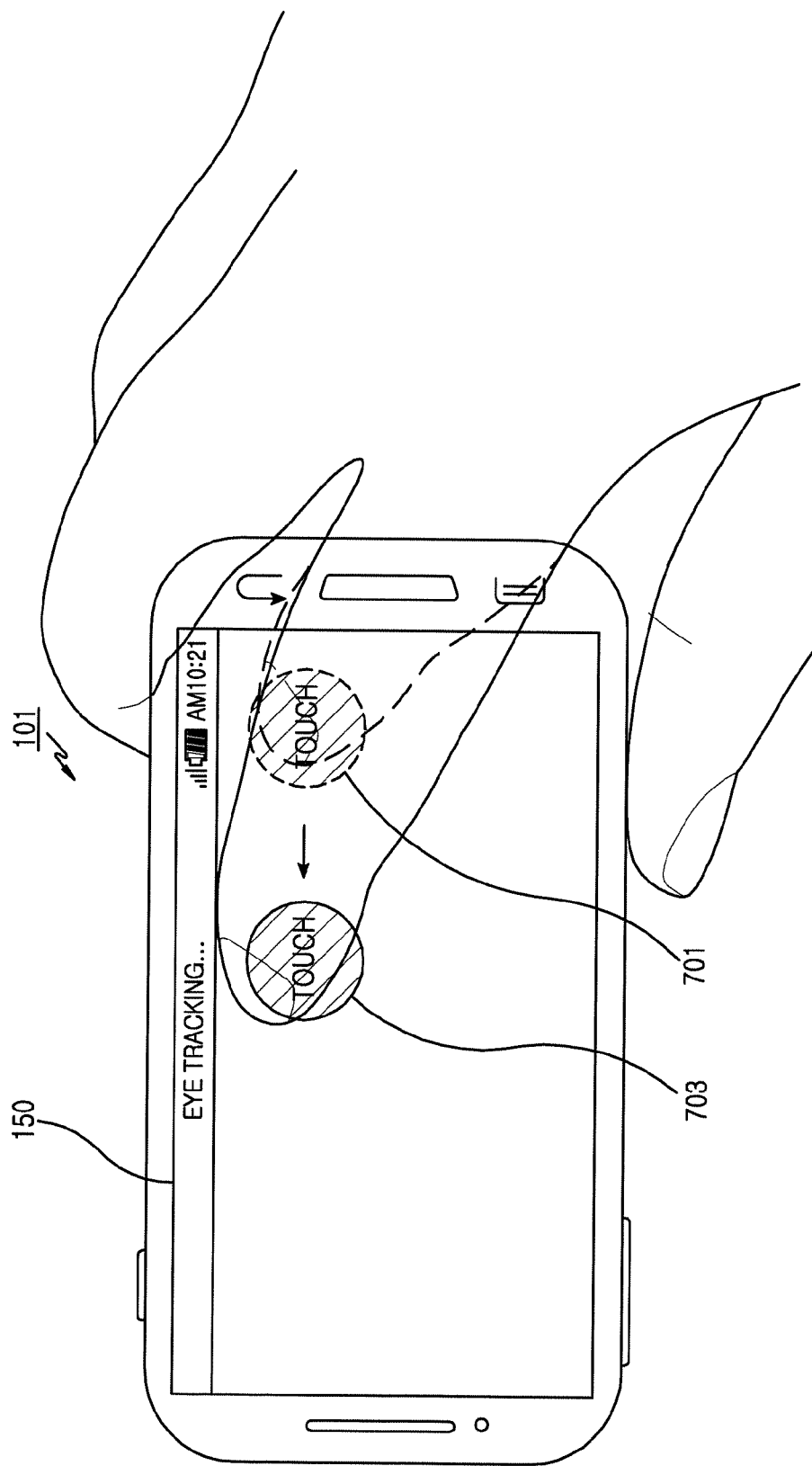
FIG. 7 illustrates an operation of moving an input area of a display in an electronic device according to various exemplary embodiments.

FIG. 7 illustrates the operation of moving an input area of a display in an electronic device according to various exemplary embodiments.

The electronic device 101 can change a position of an input area on the display 150 in a state of an eye pupil sensing mode. According to one exemplary embodiment, the electronic device 101 can enter a change mode of the input area by inputting a gesture (e.g., a double touch and a touch-and-hold) designated in an input area 710 of the display 150. The electronic device 101 can sense an input means for dragging the input area 701 of the display 150, and can sense an operation of releasing the input means by a touch at the designated position of the display 150. The electronic device 101 can move the input area 701 of the display 150 to a position of an input area 703 according to a drag operation of the input means. The electronic device 101 can change a form of the input area of the display 150 and/or a shape of the input area not only by moving the position of the input area of the display 150 but also by performing a designated operation stored in setup information of an eye pupil sensing area.

According to various exemplary embodiments, the electronic device 101 can change the position of the input area of the display 150. According to one exemplary embodiment, the electronic device 101 can determine the position at which the input area is displayed through the setup mode of the eye pupil sensing mode, and can display the input area at the designated position of the display 150 based on the input area's position stored in the setup information upon entering the eye pupil sensing mode.

According to one exemplary embodiment, if the electronic device 101 is gripped by one hand in a state of being vertically positioned, as illustrated in FIG. 7, the display 150 can be touched by an index finger or the display 150 can be touched by a thumb. If the eye pupil sensing mode is used in a state where the electronic device 101 is gripped with one hand, an input area can be displayed at a position of the display 150 at which a thumb or an index finger cannot be easily moved according to a size of a user's hand or a grip state (or a grip condition) of the electronic device 101. The electronic device 101 can change the position of the input area of the display 150 by using a designated input (e.g., a touch-and-drag). According to various exemplary embodiments, an operation of changing the input area of the display 150 described with reference to FIG. 7 can also be performed in the eye pupil mode in a state where the electronic device 101 is located vertically, instead of being limited to the eye pupil sensing mode in a state where the electronic device 101 is located horizontally.

FIGS. 8A and 8B illustrate operations based on a position of a pointer displayed on a display in an electronic device according to various exemplary embodiments.

The electronic device 101 can release a display of an input area of the display 150 when a user's eye gaze is located at the input area of the display 150, and can perform an input to the display 150 by using a typical touch operation used in the display 150.

According to FIG. 8A, the electronic device 101 can display a pointer at a designated position of the display 150 gazed by an eye pupil of the user through the camera 170. The electronic device 101 can display a pointer at a designated object (e.g., an Internet icon 803) displayed on the display 150 by sensing a movement of the eye pupil. The electronic device 101 can sense that a pointer 801 displayed on the display 150 is moved in an input area 802 as shown in FIG. 8A.

Referring to FIG. 8B, the electronic device 101 can release a display of the input area 802 displayed on the display 150 when the pointer 801 is located in the input area (e.g., the input area 802 displayed in FIG. 8A displayed on the display 150. The electronic device 101 can release the display of the input area by releasing a display of a layer for displaying the input area to the display 150 when the input area is displayed on a layer different from a layer for displaying a content, or can stop a function of the input area in a state where the display of the layer is not released. The electronic device 101 can release the display of the input area or stop the function of the input area when the input area is displayed at a designated position of the layer for displaying the content. When the electronic device 101 releases the display of the input area displayed on the display 150, similarly to a typical touch screen, a touch input can be performed in the designated area of the display 150 in which the input area is located. According to one exemplary embodiment, the electronic device 101 can display a connected Internet program to the display 150 in association with the Internet icon 803 upon sensing a gesture for touching a designated object (e.g., the Internet icon 803) displayed on the display 150 by using an input means.

The electronic device 101 can display the input area of which the display is released when it is sensed that the user's eye gaze is deviated from the designated input area of the display 150 through the camera 170, and can recover the stopped function when a function of the input area is stopped.

Figure 9A:
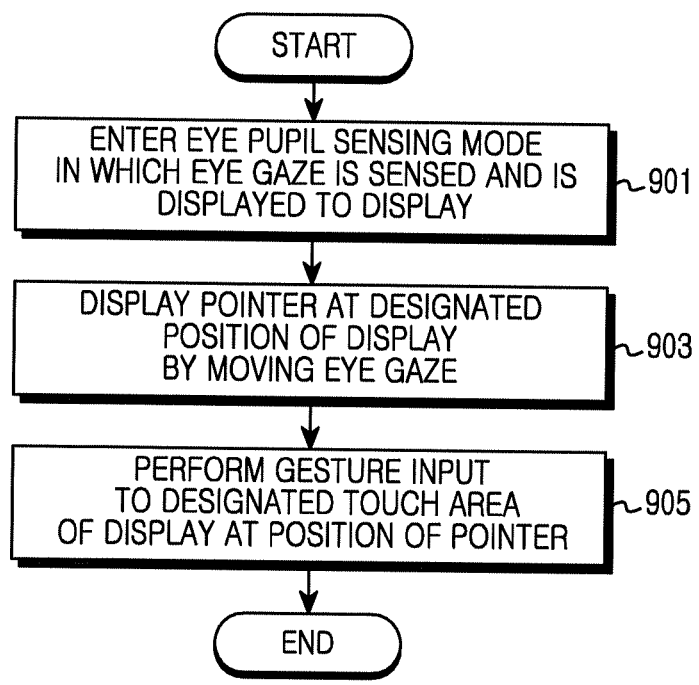
FIGS. 9A and 9B are flowcharts illustrating an operation of performing a function of an electronic device by detecting a movement of an eye pupil in an electronic device according to various exemplary embodiments.
Figure 9B:
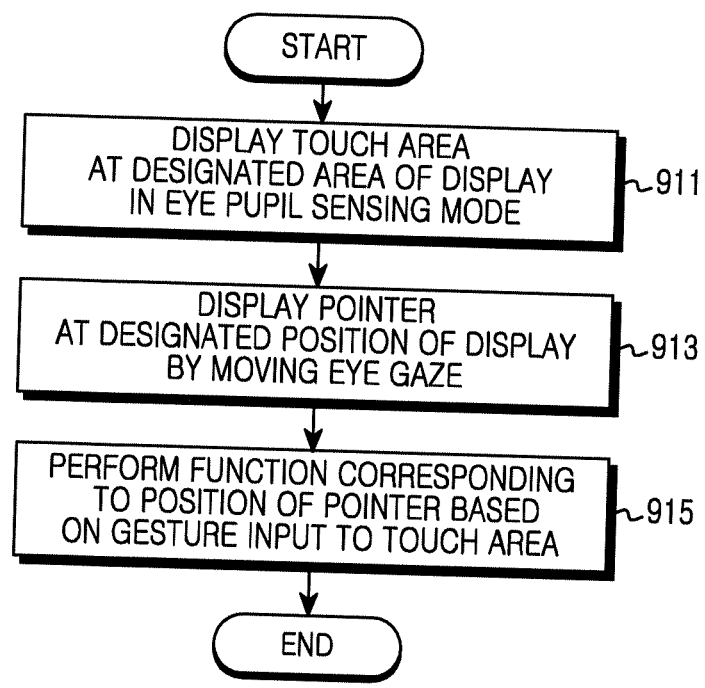

FIG. 9A and FIG. 9B are flowcharts illustrating an operation of performing a function of an electronic device by detecting a movement of an eye pupil in an electronic device according to various exemplary embodiments.

Hereinafter, various exemplary embodiments of the present disclosure are described with reference to FIG. 9A.

In operation 901, the electronic device 101 can enter an eye pupil sensing mode capable of performing a function associated with at least a part of objects displayed on the display 150 through a movement of a user's eye pupil and a designated gesture. The electronic device 101 can display a pointer at a designated position of the display 150 gazed by the user's eye pupil through the camera 170, and can display at the designated position of the display 150 the designated input area capable of handling a designated gesture which is sensed and input at the pointer.

In operation 903, the electronic device 101 can display the pointer at the designated position of the display 150 gazed by the user's eye pupil. The electronic device 101 can sense a movement of the user's eye pupil through the camera 170, and can determine the designated position of the display 150 gazed by the eye pupil as information regarding a coordinate in a virtual coordinate system configured in the display 150. The electronic device 101 can display a pointer which indicates an object displayed on the display 150 in a designated coordinate of the display 150 associated with the eye gaze.

In operation 905, the electronic device 101 can handle a gesture which is input to the input area of the display 150 as being input at the pointer displayed on the display 150. According to one exemplary embodiment, the electronic device 101 can execute a function associated with an object indicated by the pointer displayed on the display 150 when a gesture for executing an object (e.g., a single touch) is input to the input area of the display 150. The electronic device 101 can perform the gesture which is input to the input area as described above in the object indicated by the pointer displayed on the display 150.

When the electronic device 101 performs operation 905, the exemplary embodiment of FIG. 9A can end.

Hereinafter, various exemplary embodiments of the present disclosure are described with reference to FIG. 9B.

In operation 911, the electronic device 101 can display the input area capable of inputting a touch gesture in a designated area of the display 150 upon entering an eye pupil sensing mode. When the input area locates on the display 150, the electronic device 101 can display an input area having a designated shape at the designated position of the display 150 according to setup information of the eye pupil sensing mode. Alternatively, the electronic device 101 can determine the input area by inputting a designated gesture (e.g., a touch and a touch-and-drag) to the display 150 upon entering the eye pupil sensing mode.

In operation 913, the electronic device 101 can display a pointer which indicates an object at the designated position of the display 150 gazed by a user's eye through the camera 170. According to one exemplary embodiment, the electronic device 101 can sense a movement of a user's eye pupil through the camera 170, and can display the pointer which indicates the object displayed on the display 150 at the designated position of the display 150 in association with the eye gaze.

In operation 915, the electronic device 101 can handle a gesture which is input to the input area of the display 150 as a gesture which is input to the pointer displayed on the display 150. When the electronic device 101 handles the gesture which is input to the input area of the display 150 as the gesture which is input to the pointer displayed on the display 150, a function associated with the gesture of the electronic device 101 coupled to the object indicated by the pointer can be performed.

When the electronic device 101 performs operation 915, the exemplary embodiment of FIG. 9B can end.

According to various exemplary embodiments, a method of operating an electronic device can include displaying a pointer in a touch screen of the electronic device and determining an input area at a part of a position of the touch screen, moving the pointer based on a movement of a user's eye pupil, and recognizing an input detected in the input area as an input by the pointer.

According to various exemplary embodiments, the input area can be located on the touch screen based on setup information of the eye pupil sensing mode. According to various exemplary embodiments, the input area can be determined by dragging in the touch screen in a touch and touch-and-hold state at a time of entering the eye pupil sensing mode. According to various exemplary embodiments, a position of the input area can be changed to a designated position of the touch screen. According to various exemplary embodiments, the method can further include releasing a function of the input area if the pointer is located in the input area. According to various exemplary embodiments, the method can further include starting the function of the input area if the pointer is moved from the input area to an external portion of the input area. According to various exemplary embodiments, the input area can be displayed in a layer different from a layer including one or more objects in the touch screen. According to various exemplary embodiments, the moving of the pointer can be determined based on a coordinate for a position of the touch screen determined to as position gazed by the eye pupil by sensing a movement of the eye pupil. According to various exemplary embodiments, the input can be determined by a designated gesture which is input by touching the input area. According to various exemplary embodiments, the method can further include releasing the eye pupil sensing mode upon sensing a touch input at the external portion of the input area of the touch screen. According to various exemplary embodiments, the input area can be determined to an area configured in a touch panel operatively coupled to the touch screen.

According to various exemplary embodiments, a method of operating an electronic device can include displaying a pointer in a display of the electronic device and determining an input area at a designated area of a touch panel, moving the pointer based on a movement of a user's eye pupil, and recognizing an input detected in the input area as an input by the pointer.

According to various exemplary embodiments, a method of operating an electronic device can include displaying a pointer display area and an input area by distinguishing the area, displaying a pointer to the pointer display area, and upon detection of a touch in the input area, handling that the touch is input at a position at which the pointer is displayed.

According to various exemplary embodiments, if the electronic device is gripped by one hand, a position of the input area can be determined to a designated position of a display which can be easily touched by a designated finger. According to various exemplary embodiments, the input area can be displayed based on setup information including at least one of position, shape, and size information of the input area. According to various exemplary embodiments, the displaying of the input area can further include determining at least one of a position, shape, and size of the input area by touching or dragging a display in which the input area is displayed when the input area is displayed. According to various exemplary embodiments, a position of the input area can be changed in the display based on a designated input. According to various exemplary embodiments, the method can further include releasing a display of the input area if the pointer is located in the input area. According to various exemplary embodiments, the input area can be displayed on a layer different from the layer to which the pointer area is displayed. According to various exemplary embodiments, a case where a touch is detected in the input area can be a case where a gesture designated to execute at least one function by touching the display is detected in the input area. According to various exemplary embodiments, the method can further include, if the touch is detected in the pointer display area, releasing the display of the pointer display area and the input area. According to various exemplary embodiments, the input area can be additionally determined in a touch panel operatively coupled to the display to which the pointer display area is displayed. According to various exemplary embodiments, the pointer can be displayed based on a user's eye pupil movement, and can be displayed in an overlapping manner on at least one of icons displayed on the display.

According to various exemplary embodiments, a method of operating an electronic device can include displaying a pointer to a display, detecting a touch in an input area independent of the display, and handling a touch detected in the input area as a touch of a position at which the pointer is displayed. According to various exemplary embodiments, the input area can be a touch panel formed independently in a rear portion of the display.

Figure 10:
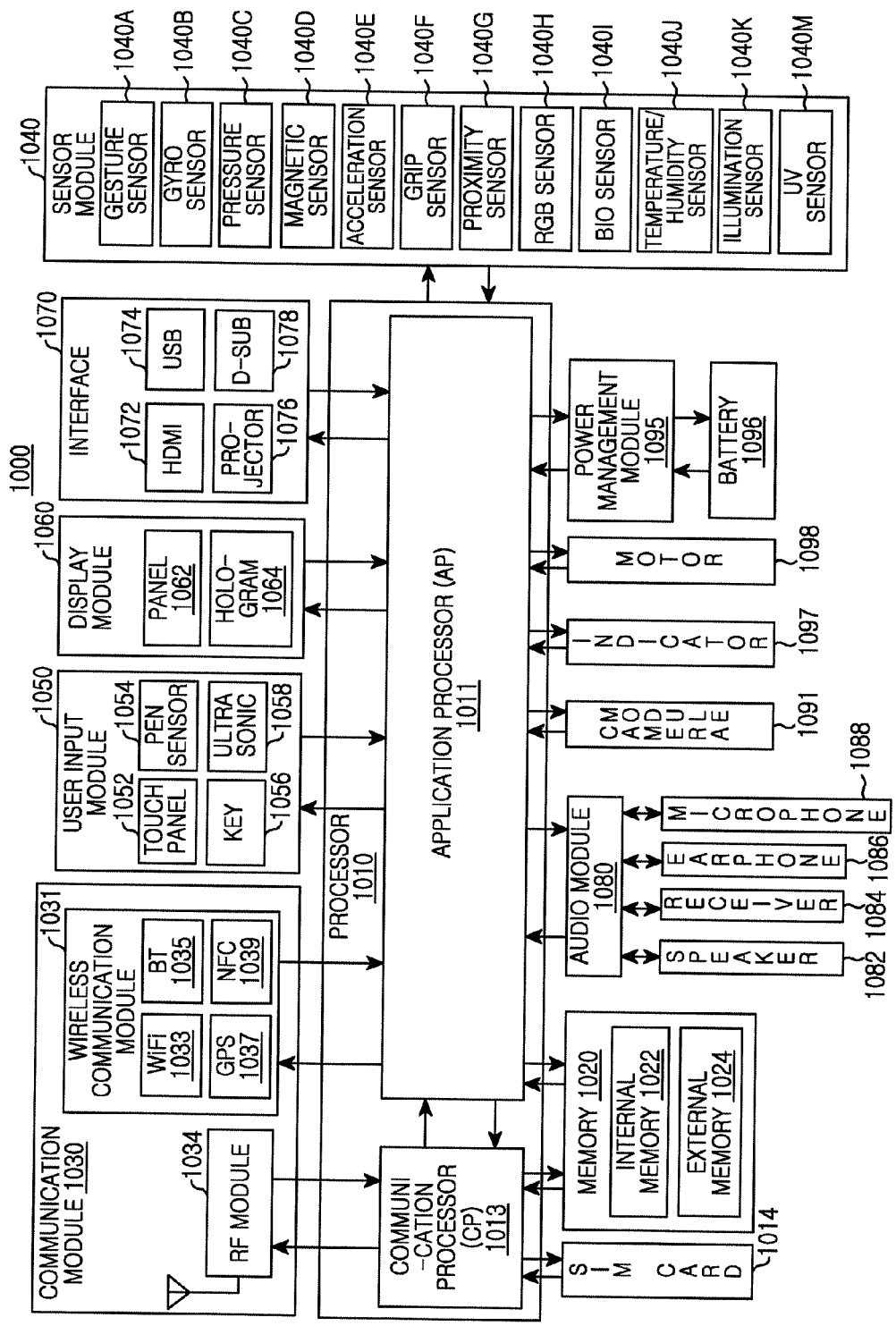
FIG. 10 is a block diagram of an electronic device according to various exemplary embodiments.

FIG. 10 is a block diagram of an electronic device according to various exemplary embodiments.

For example, an electronic device 1000 can constitute all or some parts of the electronic device 101 of FIG. 1. Referring to FIG. 10, the electronic device 1000 can include one or more processors 1010, a Subscriber Identification Module (SIM) card 1014, a memory 1020, a communication module 1030, a sensor module 1040, an input module 1050, a display 1060, an interface 1070, an audio module 1080, a camera module 1091, a power management module 1095, a battery 1096, an indicator 1097, and a motor 1098.

In addition, the processor 1010 (e.g., the processor 120) can include one or more Application Processors (APs) 1011 or one or more Communication Processors (CPs) 1013.

Although it is illustrated in FIG. 10 that the AP 1011 and the CP 1013 are included in the processor 1010, the AP 1011 and the CP 1013 can be included respectively in different Integrated Circuit (IC) packages. According to one exemplary embodiment, the AP 1011 and the CP 1013 can be included in one IC package.

The AP 1011 can control a plurality of hardware or software constitutional elements connected to the AP 1011 by driving an operating system or an application program, and can process a variety of data including multimedia data and can perform an arithmetic operation. The AP 1011 can be implemented, for example, with a System on Chip (SoC). According to one exemplary embodiment, the processor 1010 can further include a Graphic Processing Unit (GPU, not shown).

The CP 1013 can perform a function of managing a data link and changing a communication protocol in communication between different electronic devices (e.g., the electronic device 102, the electronic device 104, or the server 106) connected through a network with the electronic device 1000 (e.g., the electronic device 101) including hardware elements. The CP 1013 can be implemented with an SoC. According to one exemplary embodiment, the CP 1013 can perform at least a part of a multimedia control function. For example, the CP 1013 can identify and authenticate an electronic device in a communication network by using a subscriber identity module (e.g., the SIM card 1014). In this case, the CP 1013 can provide a service including a voice call, a video call, a text message, or packet data to a user.

Further, the CP 1013 can control data transmission/reception of the communication module 1030. Although constitutional elements such as the CP 1013, power management module 1095, the memory 1020, and the like are illustrated as separate constitutional elements with respect to the AP 1011 in FIG. 10, according to one exemplary embodiment, the AP 1011 can also be implemented such that at least one part (e.g., the CP 1013) of the aforementioned constitutional elements is included.

According to one exemplary embodiment, the AP 1011 or the CP 1013 can load an instruction or data, which is received from each non-volatile memory connected thereto or at least one of different constitutional elements, to a volatile memory and can process the instruction or data. In addition, the AP 1011 or the CP 1013 can store data, which is received from at least one of different constitutional elements or generated by at least one of different constitutional elements, into the non-volatile memory.

The SIM card 1014 can be a card which includes a SIM, and can be inserted to a slot formed at a specific location of the electronic device. The SIM card 1014 can include unique identification information (e.g., an Integrated Circuit Card IDentifier (ICCID)) or subscriber information (e.g., an International Mobile Subscriber Identity (IMSI)).

The memory 1020 (e.g., the memory 130) can include an internal memory 1022 or an external memory 1024. The internal memory 1022 can include, for example, at least one of a volatile memory (e.g., a Dynamic RAM (DRAM), a Static RAM (SRAM), a Synchronous Dynamic RAM (SDRAM), etc.) or a non-volatile memory (e.g., a One Time Programmable ROM (OTPROM), a Programmable ROM (PROM), an Erasable and Programmable ROM (EPROM), an Electrically Erasable and Programmable ROM (EEPROM), a Mask ROM, a Flash ROM, a NAND flash memory, a NOR flash memory, etc.). According to one exemplary embodiment, the internal memory 1022 can have a form of a Solid State Drive (SSD). The external memory 1024 can be a flash drive, and can further include, for example, Compact Flash (CF), Secure Digital (SD), Micro Secure Digital (Micro-SD), Mini Secure digital (Mini-SD), extreme Digital (xD), memory stick, and the like. The external memory 1024 can be operatively coupled to the electronic device 1000 via various interfaces. According to one exemplary embodiment, the electronic device 1000 can further include a storage unit (or a storage medium) such as a hard drive.

The communication module 1030 (e.g., the communication interface 160) can include a wireless communication module 1031 or a Radio Frequency (RF) module 1034. The wireless communication module 1031 can include, for example, a WiFi 1033, a BlueTooth (BT) 1035, a Global Positioning System (GPS) 1037, or a Near Field Communication (NFC) 1039. For example, the wireless communication module 1031 can provide a wireless communication function by using a radio frequency. Additionally or alternatively, the wireless communication module 1031 can include a network interface (e.g., a LAN card), modem, or the like for connecting the electronic device 1000 to a network (e.g., Internet, LAN, WAN, telecommunication network, cellular network, satellite network, POTS, etc.).

The RF module 1034 can serve to transmit/receive data, for example, to transmit/receive an RF signal. Although not shown, the RF module 1034 can include, for example, a transceiver, a Power Amp Module (PAM), a frequency filter, a Low Noise Amplifier (LNA), and the like. The RF module 1034 can further include a component for transmitting/receiving a radio wave on a free space in a wireless communication, for example, a conductor, a conducting wire, and the like.

The sensor module 1040 can measure a physical quantity or detect an operation state of the electronic device 1000, and thus can convert the measured or detected information into an electric signal. The sensor module 1040 can include, for example, at least one of a gesture sensor 1040A, a gyro sensor 1040B, a pressure sensor 1040C, a magnetic sensor 1040D, an acceleration sensor 1040E, a grip sensor 1040F, a proximity sensor 1040G, a color sensor 1040H (e.g., a Red, Green, Blue (RGB) sensor), a bio sensor 1040I, a temperature/humidity sensor 1040J, an illumination sensor 1040K, and an Ultra Violet (UV) sensor 1040M. Additionally or alternatively, the sensor module 1040 can include, for example, an E-node sensor (not shown), an ElectroMyoGraphy (EMG) sensor (not shown), an ElectroEncephaloGram (EEG) sensor (not shown), an ElectroCardioGram (ECG) sensor (not shown), a fingerprint sensor (not shown), and the like. The sensor module 1040 can further include a control circuit for controlling at least one or more sensors included therein.

The input module 1050 can include a touch panel 1052, a (digital) pen sensor 1054, a key 1056, or an ultrasonic input unit 1058. The touch panel 1052 can recognize a touch input, for example, by using at least one of an electrostatic type, a pressure-sensitive type, and an ultrasonic type. The touch panel 1052 can further include a control circuit. In case of the electrostatic type, not only a physical contact but also a proximity recognition is possible. The touch panel 1052 can further include a tactile layer. In this case, the touch panel 1052 can provide the user with a tactile reaction.

The (digital) pen sensor 1054 can be implemented, for example, by using the same or similar method of receiving a touch input of the user or by using an additional sheet for recognition. The key 1056 can be, for example, a physical button, an optical key, a keypad, or a touch key. The ultrasonic input unit 1058 is a device by which a user equipment detects a sound wave through a microphone (e.g., a microphone 1088) by using a pen which generates an ultrasonic signal, and is a device capable of radio recognition. According to one exemplary embodiment, the electronic device 1000 can use the communication module 1030 to receive a user input from an external device (e.g., a network, a computer, or a server) connected thereto.

The display 1060 (e.g., the display 150) can include a panel 1062, a hologram 1064, or a projector 1066. The panel 1062 can be, for example, a Liquid-Crystal Display (LCD), an Active-Matrix Organic Light-Emitting Diode (AM-OLED), and the like. The panel 1062 can be implemented, for example, in a flexible, transparent, or wearable manner. The panel 1062 can be constructed as one module with the touch panel 1052. The hologram 1064 can use an interference of light and show a stereoscopic image in the air. The projector 1066 can display an image by projecting a light beam onto a screen. The screen can be located, for example, inside or outside the electronic device 1000. According to one exemplary embodiment, the display 1060 can further include a control circuit for controlling the panel 1062, the hologram 1064, or the projector 1066.

The interface 1070 can include, for example, a High-Definition Multimedia Interface (HDMI) 1072, a Universal Serial Bus (USB) 1074, an optical communication interface 1076, or a D-subminiature (D-sub) 1078. The interface 1070 can be included, for example, in the communication interface 160 of FIG. 1. Additionally or alternatively, the interface 1070 can include, for example, a Mobile High-definition Link (MHL) (not shown), a Secure Digital (SD)/Multi-Media Card (MMC) (not shown) or Infrared Data Association (IrDA) (not shown).

The audio module 1080 can bilaterally convert a sound and electric signal. At least some constitutional elements of the audio module 1080 can be included in, for example, the input/output interface 140 of FIG. 1. The audio module 1080 can convert sound information which is input or output, for example, through a speaker 1082, a receiver 1084, an earphone 1086, the microphone 1088, and the like.

The camera module 1091 is a device for image and video capturing, and according to one exemplary embodiment, can include one or more image sensors (e.g., a front sensor or a rear sensor), a lens (not shown), an Image Signal Processor (ISP) (not shown), or a flash (not shown, e.g., LED or xenon lamp).

The power management module 1095 can manage a power of the electronic device 1000. Although not shown, the power management module 1095 can include, for example, a Power Management Integrated Circuit (PMIC), a charger Integrated Circuit (IC), or a battery fuel gauge.

The PMIC can be placed, for example, inside an IC or SoC semiconductor. Charging can be classified into wired charging and wireless charging. The charger IC can charge a battery, and can avoid an over-voltage or over-current flow from a charger. According to one exemplary embodiment, the charger IC can further include a charger IC for at least one of the wired charging and the wireless charging. The wireless charging can be classified into, for example, a magnetic resonance type, a magnetic induction type, and an electromagnetic type. An additional circuit for the wireless charging, for example, a coil loop, a resonant circuit, a rectifier, and the like, can be added.

The battery gauge can measure, for example, a residual quantity of the battery 1096 and a voltage, current, and temperature during charging. The battery 1096 can store or generate an electricity, and can supply a power to the electronic device 1000 by using the stored or generated electricity. For example, the battery 1096 can include a rechargeable battery or a solar battery.

The indicator 1097 can indicate a specific state, for example, a booting state, a message state, a charging state, and the like, of the electronic device 1000 or a part thereof (e.g., the AP 1011). The motor 1098 can convert an electric signal into a mechanical vibration. Although not shown, the electronic device 1000 can include a processing unit (e.g., a GPU) for supporting a mobile TV. The processing unit for supporting the mobile TV can process media data according to a protocol of, for example, Digital Multimedia Broadcasting (DMB), Digital Video Broadcasting (DVB), media flow, and the like.

According to various exemplary embodiments, a method of operating an electronic device, the method comprising displaying a specific position in a display; and handling a touch detected in the display as a touch of the specific position. Wherein the specific position is a coordinate associated with the display based on an eye pupil and a movement of the eye pupil. Wherein the displaying of the specific position includes displaying at least one of a pointer, an identifier, and an indicator at the specific position or displaying a state where an object associated with the specific position is selected. Wherein the handling includes handling the detected touch as a touch on a coordinate associated with the specific position. Wherein the detected touch is a touch detected in a portion of the display other than the specific position. Wherein the detected touch is a touch detected in an input area configured in at least a portion of the display. Wherein the detected touch is a single touch or a touch including a drag. Wherein a layer configured to display the specific position is a layer different from a layer configured to input the touch. Further comprising handling a touch which is input to a touch panel operatively coupled to the display as a touch of the specific position. Wherein the detected touch is handled not as a touch of a position at which the detected touch occurs but as a touch of the specific position.

Each of the aforementioned constitutional element of the electronic device according to various exemplary embodiment of the present disclosure can consist of one or more components, and names of corresponding constitutional elements can vary depending on a type of electronic device. The electronic device according to various exemplary embodiments of the present disclosure can include at least one of the aforementioned constitutional elements. Some of the constitutional elements can be omitted, or additional other constitutional elements can be further included. In addition, some of the constitutional elements of the electronic device according to various exemplary embodiments of the present disclosure can be combined and constructed as one entity, so as to equally perform functions of corresponding constitutional elements before combination.

According to various exemplary embodiments, an electronic device comprising a display configured to display a specific position and configured to detect a touch, and a processor configured to provide control to display the specific position in the display, and configured to handle the touch detected in the display as a touch of the specific position. Wherein the processor determines the specific position to a coordinate associated with the display based on an eye pupil and a movement of the eye pupil. Wherein the processor displays at least one of a pointer, an identifier, and an indicator at the specific position or displays a state where an object associated with the specific position is selected. Wherein the processor handles the detected touch as a touch on a coordinate associated with the specific position.

Wherein the processor handles a touch detected in a portion of the display other than the specific position as the detected touch. Wherein the processor handles a touch detected in an input area configured in at least a portion of the display as the touch of the specific position. Wherein the processor determines a single touch or a touch including a drag as the detected touch. Wherein the processor configures a layer configured to display the specific position and a layer configured to input the touch as different layers. Wherein the processor handles a touch which is input to a touch panel operatively coupled to the display as a touch of the specific position. Wherein the processor handles the detected touch not as a touch of a position at which the detected touch occurs but as a touch of the specific position.

The electronic device can move a pointer displayed on a display in association with an eye gaze by sensing a user's eye pupil, and can handle this as a gesture which is input to a pointer by touching a designated position of the display. Therefore, the electronic device can perform a function associated with an object displayed at a designated position of the display which cannot be touched by a designated finger of a hand which grips the electronic device.

Various exemplary embodiments of the present disclosure can be performed by at least one of one or more programs included in a memory of the electronic device 101, one or more processors (e.g., the processor 120), and the gesture processing module 180.

According to various exemplary embodiments, at least a part of an apparatus and method according to various exemplary embodiments disclosed in the claims and/or specification of the present disclosure can be implemented in a form (e.g., a module) including two or more combination of hardware, software, and firmware. The "module" can be a minimum unit of an integrally constituted component or can be a part thereof. The "module" can be a minimum unit for performing one or more functions or can be a part thereof. The "module" can be mechanically or electrically implemented. When implemented in software, computer-interpretable storage medium (or a computer-readable storage medium) for storing one or more programs (or programming modules) can be provided. For example, the software can be implemented with an instruction stored in a computer-readable storage medium in a programming module form. The one or more programs include instructions for allowing the electronic device to execute the methods based on the embodiments disclosed in the claims and/or specification of the present disclosure. If the instruction is executed by one or more processors (e.g., the processor 210), the one or more processors can perform a function corresponding to the instruction. The computer-readable storage media can be, for example, the memory 130. At least some parts of the programming module can be implemented (e.g., executed), for example, by the processor 120. At least some parts of the programming module can include modules, programs, routines, sets of instructions, processes, and the like, for performing one or more functions.

The program (i.e., the software module or software) can be stored in a random access memory, a non-volatile memory including a flash memory, a Read Only Memory (ROM), an Electrically Erasable Programmable Read Only Memory (EEPROM), a magnetic disc storage device, a Compact Disc-ROM (CD-ROM), Digital Versatile Discs (DVDs) or other forms of optical storage devices, and a magnetic cassette. Alternatively, the program can be stored in a memory configured in combination of all or some of these storage media. In addition, the configured memory can be plural in number.

Further, the program can be stored in an attachable storage device capable of accessing the electronic device through a communication network such as the Internet, an Intranet, a Local Area Network (LAN), a Wide LAN (WLAN), or a Storage Area Network (SAN) or a communication network configured by combining the networks. The storage device can access an electronic device via an external port. Further, an additional storage device can access a portable electronic device on a communication network. The aforementioned hardware device can be configured to operate as one or more software modules to perform the operation for various exemplary embodiments of the present disclosure, and the other way around is also possible.

The module or programming module according to various exemplary embodiments of the present disclosure can further include at least one or more constitutional elements among the aforementioned constitutional elements, or may omit some of them, or may further include additional other constitutional elements. Operations performed by a module, programming module, or other constitutional elements according to various exemplary embodiments of the present disclosure may be executed in a sequential, parallel, repetitive, or heuristic manner. In addition, some of the operations may be executed in a different order or may be omitted, or other operations may be added.

While the present disclosure has been shown and described with reference to certain preferred embodiments thereof, it will be understood by those skilled in the art that various changes in form and details may be made therein without departing from the spirit and scope of the disclosure as defined by the appended claims. Therefore, the scope of the present disclosure is defined not by the detailed description of the present disclosure but by the appended claims, and all differences within the scope will be construed as being included in the present disclosure.

What is claimed is:

1. A method for operating a handheld a electronic device, the method comprising:
    displaying a plurality of objects on a screen;
    detecting an eye of a user of the electronic device;
    in response to detecting the eye of the user, displaying an indicator and a predetermined touch area on the screen;
    detecting a movement of the eye of the user of the electronic device;
    moving the indicator on the screen according to the movement of the eye of the user of the electronic device;
    detecting a touch on the predetermined touch area of the screen; and
    in response to detecting the touch on the predetermined touch area of the screen, selecting an object on which the indicator is located, among the plurality of the objects on the screen,
    wherein the predetermined touch area and the selected object are apart from each other.

2. The method of claim 1, wherein the indicator comprises at least one of a pointer, and an identifier.

3. The method of claim 1, wherein the predetermined touch area is located in a lower portion of the screen.

4. The method of claim 1, wherein the predetermined touch area is displayed based on a state where the electronic device is gripped with a hand of the user.

5. The method of claim 1, wherein the predetermined touch area is configurable on the display.

6. The method of claim 5, wherein the touch is one of a single touch and a touch drag.

7. The method of claim 1, wherein the indicator belongs to a first layer and the touch area belongs to a second layer different from the first layer.

8. The method of claim 1, wherein the predetermined touch area is changed based on a size of a hand of the user or a state where the electronic device is gripped with a hand of the user.

9. A handheld electronic device comprising:
a display configured to display displaying a plurality of objects on a screen of the electronic device; and
a processor configured to:
  detect an eye of a user of the electronic device;
  in response to detecting the eye of the user, display an indicator and a predetermined touch area on the screen;
  detect a movement of the eye of the user of the electronic device;
  move the indicator on the screen according to the movement of the eye of the user of the electronic device;
  detect a touch on the predetermined touch area of the screen of the electronic device; and
  in response to detecting the touch on the predetermined touch area of the screen, select an object on which the indicator is located, among the plurality of the objects on the screen,
  wherein the predetermined touch area and the selected object are apart from each other.

10. The electronic device of claim 9, wherein the indicator comprises at least one of a pointer, and an identifier.

11. The electronic device of claim 9, wherein the predetermined touch area is located in a lower portion of the screen.

12. The electronic device of claim 9, wherein the predetermined touch area is displayed based on a state where the electronic device is gripped with a hand of the user.

13. The electronic device of claim 9, wherein the predetermined touch area is configurable on the display.

14. The electronic device of claim 13, wherein the touch is one of a single touch and a touch drag.

15. The electronic device of claim 9, wherein the indicator belongs to a first layer and the touch area belongs to a second layer different from the first layer.

16. The electronic device of claim 9, wherein the predetermined touch area is changed based on a size of a hand of the user or a state where the electronic device is gripped with a hand of the user.

* * * * *